US009148901B2

(12) United States Patent
Nakano et al.

(10) Patent No.: US 9,148,901 B2
(45) Date of Patent: Sep. 29, 2015

(54) RECEIVING APPARATUS, TRANSMITTING APPARATUS AND LINE CONNECTION SWITCHING METHOD

(71) Applicant: FUJITSU LIMITED, Kawasaki-shi, Kanagawa (JP)

(72) Inventors: Keiichi Nakano, Kawasaki (JP); Tomohiko Choraku, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 13/958,203

(22) Filed: Aug. 2, 2013

(65) Prior Publication Data

US 2013/0315055 A1 Nov. 28, 2013

Related U.S. Application Data

(63) Continuation of application No. PCT/JP2011/052424, filed on Feb. 4, 2011.

(51) Int. Cl.
*H04L 1/00* (2006.01)
*H04W 76/04* (2009.01)
(Continued)

(52) U.S. Cl.
CPC ............. *H04W 76/04* (2013.01); *H04L 1/0003* (2013.01); *H04L 1/22* (2013.01); *H04L 41/0654* (2013.01); *H04W 24/04* (2013.01); *H04W 28/04* (2013.01)

(58) Field of Classification Search
CPC ... H04L 45/28; H04L 12/437; H04L 41/0654; H04L 41/0659; H04L 41/0668; H04L 2012/5627
USPC .................................................. 370/216–225
See application file for complete search history.

(56) References Cited

U.S. PATENT DOCUMENTS

2006/0274782 A1 12/2006 Rikitake
2008/0175142 A1 7/2008 Uematsu
(Continued)

FOREIGN PATENT DOCUMENTS

JP  2008-177941  7/2008
JP  2008-258701  10/2008
(Continued)

OTHER PUBLICATIONS

International Search Report mailed in connection with PCT/JP2011/052424 on Mar. 1, 2011.
(Continued)

*Primary Examiner* — Dady Chery
(74) *Attorney, Agent, or Firm* — Fujitsu Patent Center

(57) ABSTRACT

A receiving apparatus in a wireless communication system that involves both data transmission using a virtual transmission path in which a plurality of wireless lines of which modulation method is variable are virtually consolidated into one, and time-division multiplex transmission, includes a releasing unit that releases, when a failure occurs in a current line used in the time-division multiplex transmission, one wireless line in the plurality of wireless lines constituting the virtual transmission path from the virtual transmission path; a demodulation unit that changes a modulation method used for demodulation of the one wireless line released from the virtual transmission path by the releasing unit to a modulation method used in the time-division multiplex transmission; and a switching unit that switches line connection from the current line in which the failure has occurred to the one wireless line of which modulation method has been changed by the demodulation unit.

15 Claims, 33 Drawing Sheets

(51) Int. Cl.
*H04L 1/22* (2006.01)
*H04L 12/24* (2006.01)
*H04W 24/04* (2009.01)
*H04W 28/04* (2009.01)

(56) References Cited

U.S. PATENT DOCUMENTS

| | | |
|---|---|---|
| 2008/0225882 A1 | 9/2008 | Atsumi |
| 2009/0003326 A1 | 1/2009 | Ozaki |
| 2009/0028548 A1 | 1/2009 | Tamura |
| 2009/0067324 A1* | 3/2009 | Licardie et al. ............... 370/225 |
| 2011/0164622 A1 | 7/2011 | Tamura |

FOREIGN PATENT DOCUMENTS

| | | |
|---|---|---|
| JP | 2009-10441 | 1/2009 |
| JP | 2010-288067 | 12/2010 |
| WO | 2005/079015 | 8/2005 |
| WO | 2009/033168 | 3/2009 |

OTHER PUBLICATIONS

Notification of Transmittal of Translation of the International Preliminary Report on Patentability (Form PCT/IB/338, Form PCT/IB/373 & Form PCT/ISA/237), International Application No. PCT/JP2011/052424, 6 pages, dated Aug. 15, 2013.

* cited by examiner

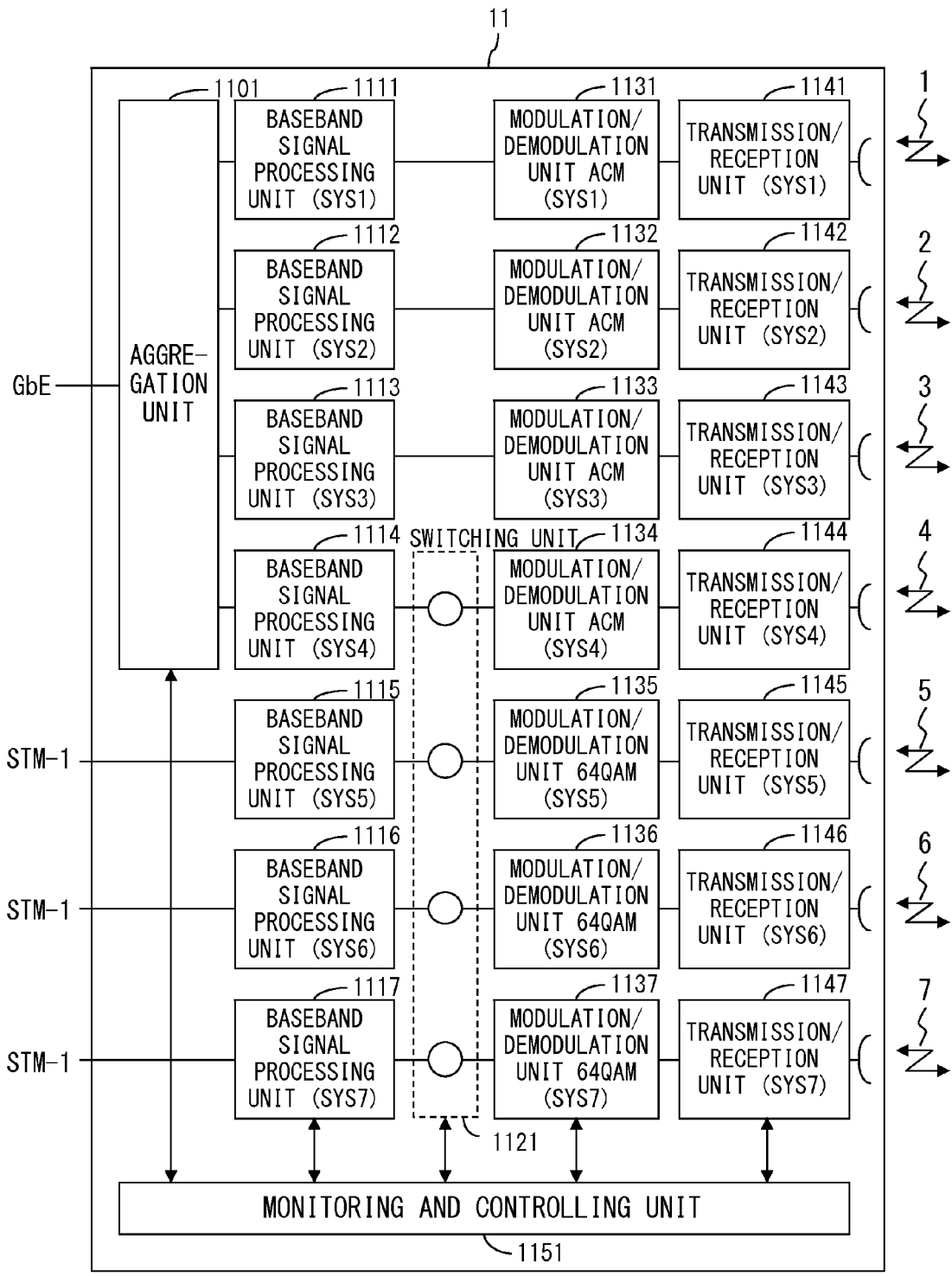
F I G. 1 A

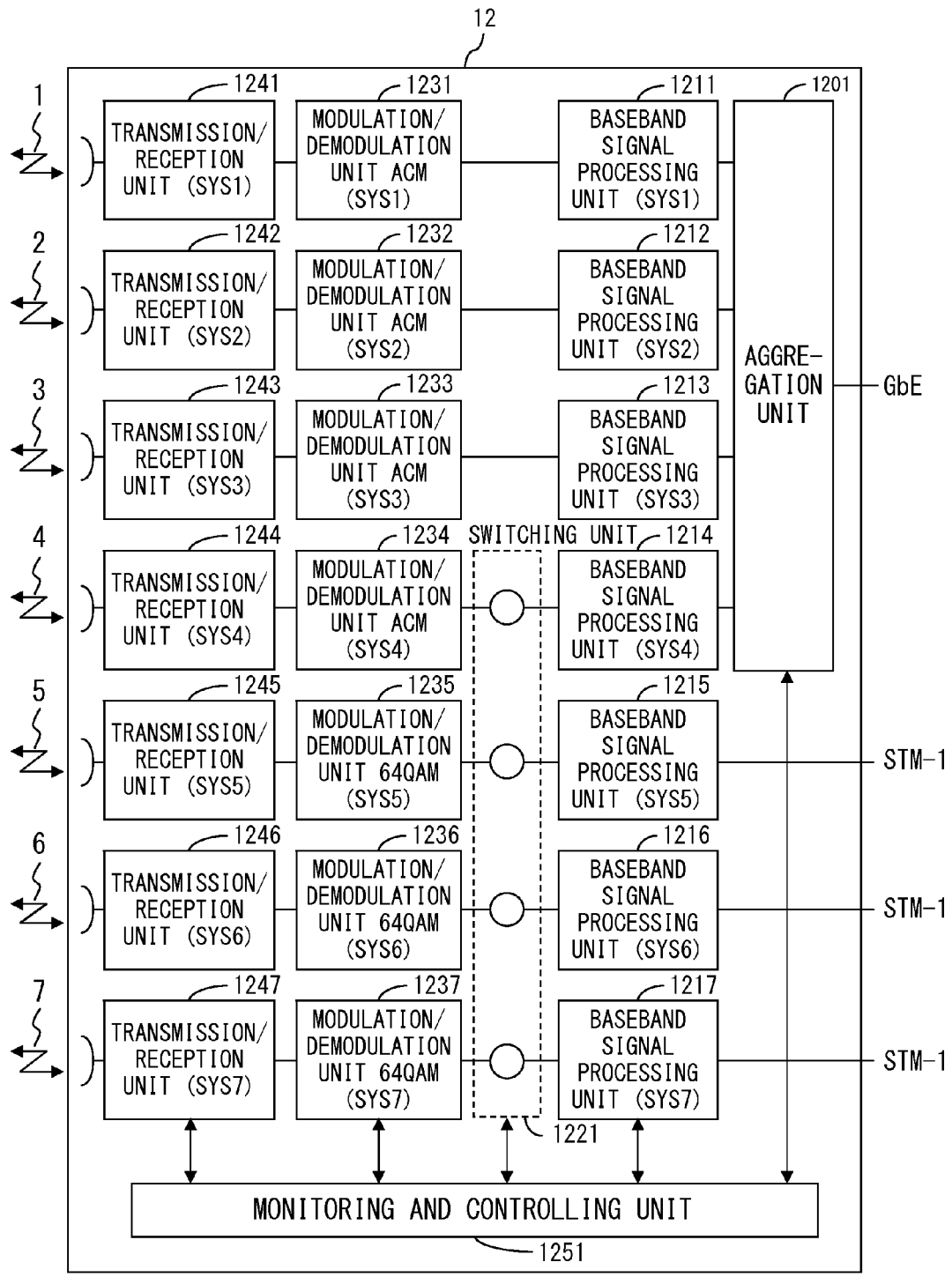
F I G. 1 B

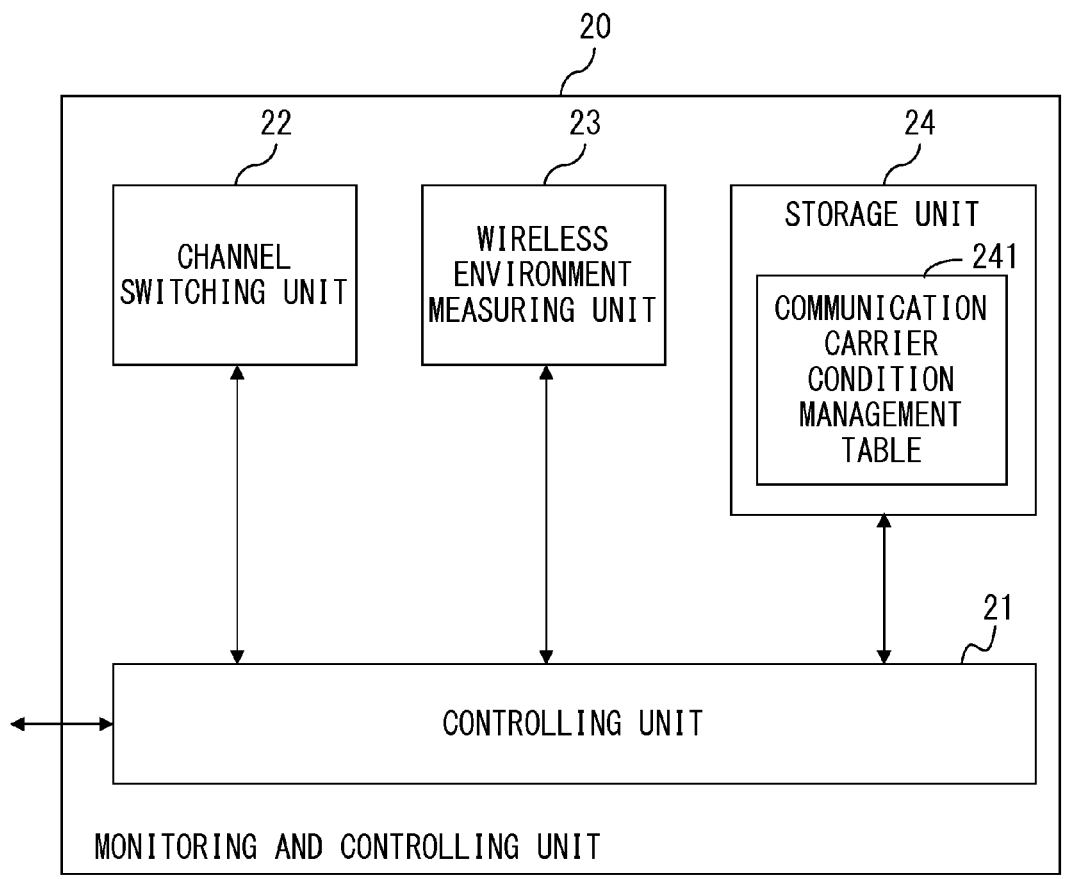
F I G. 2

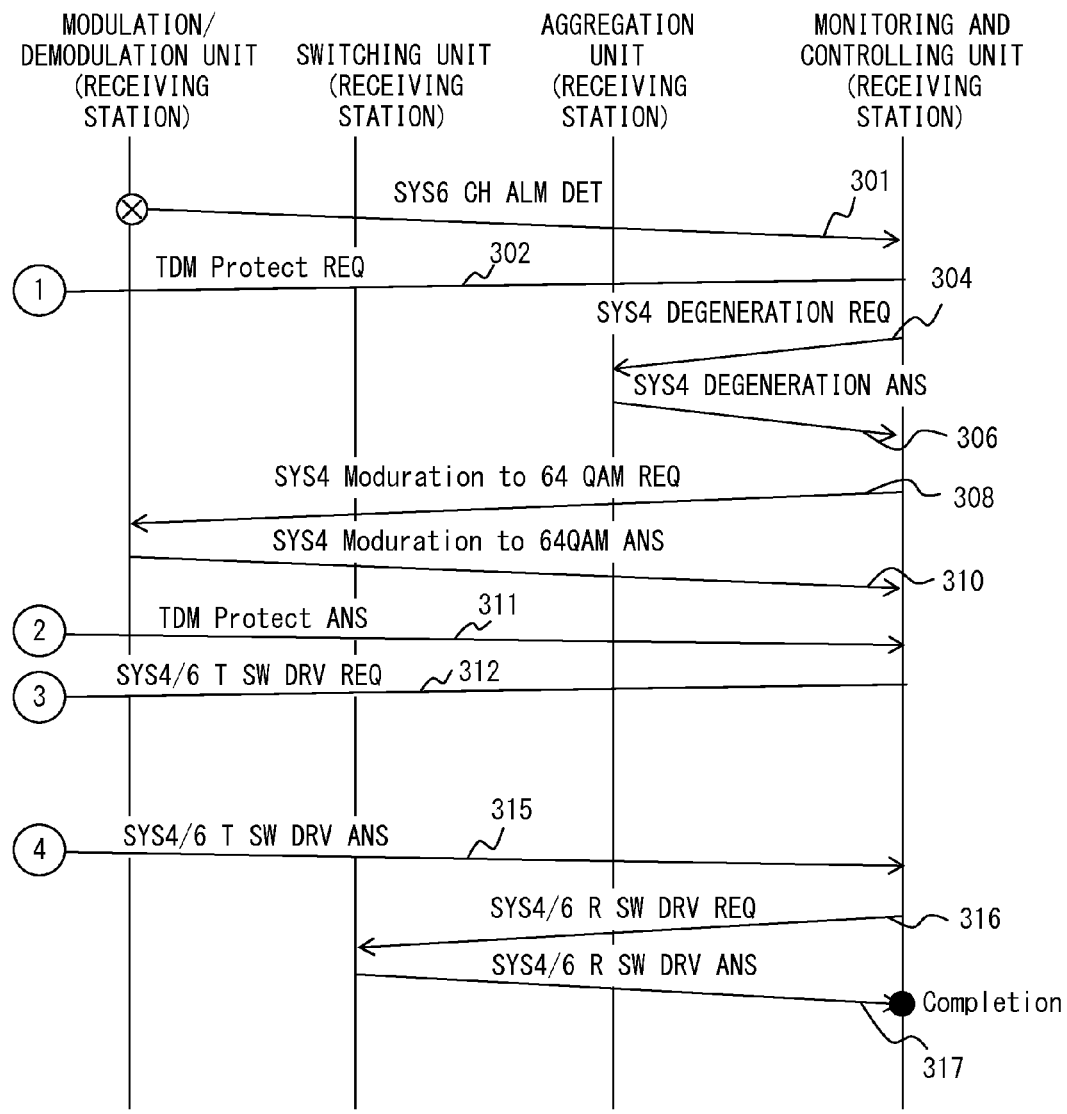
F I G. 3 B

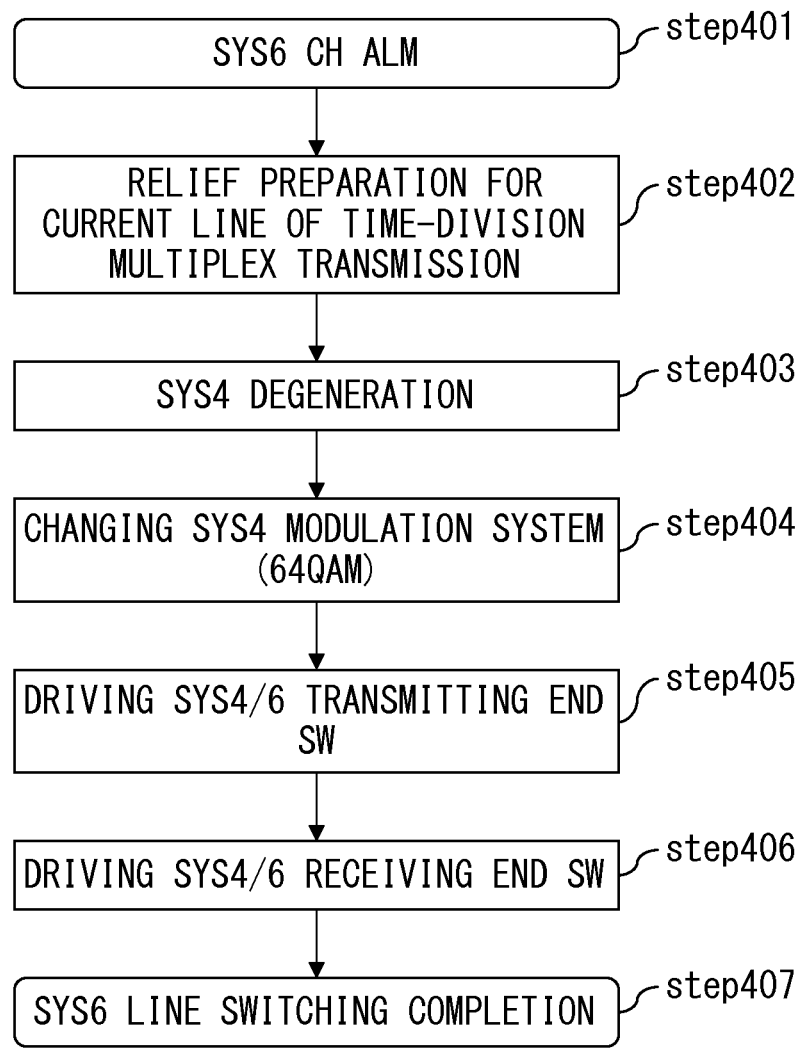
F I G. 4

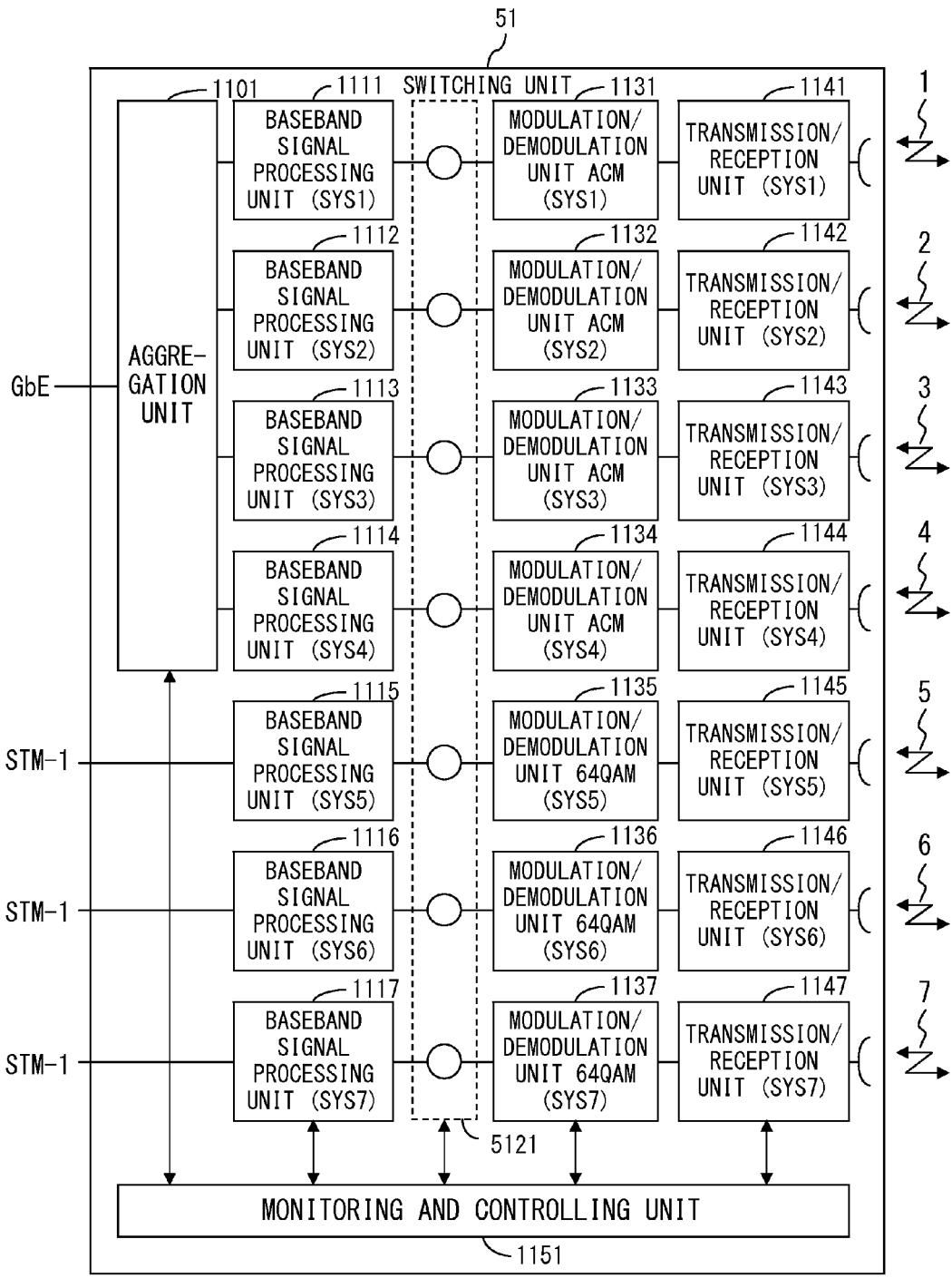
F I G. 5 A

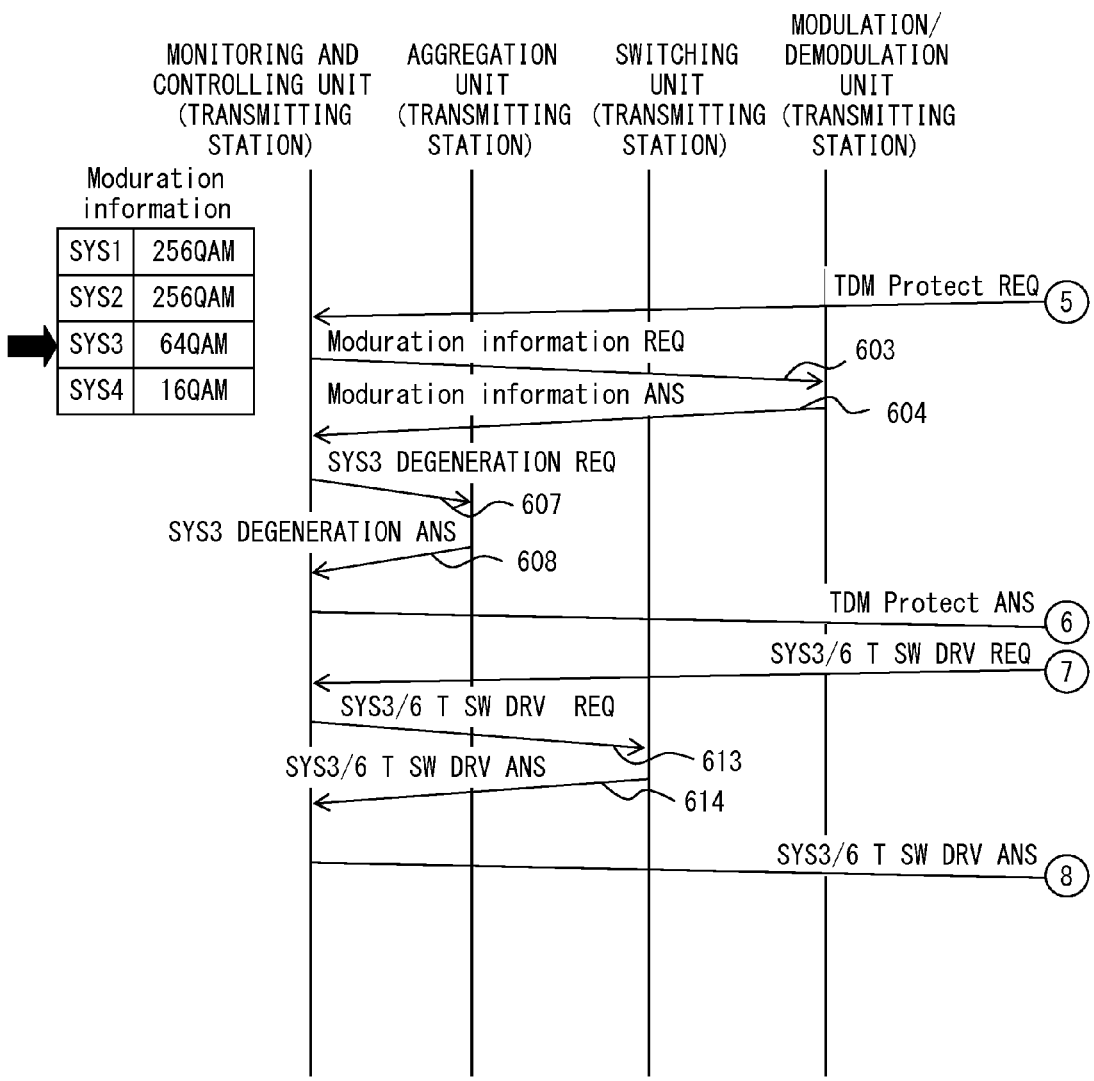
F I G. 6 A

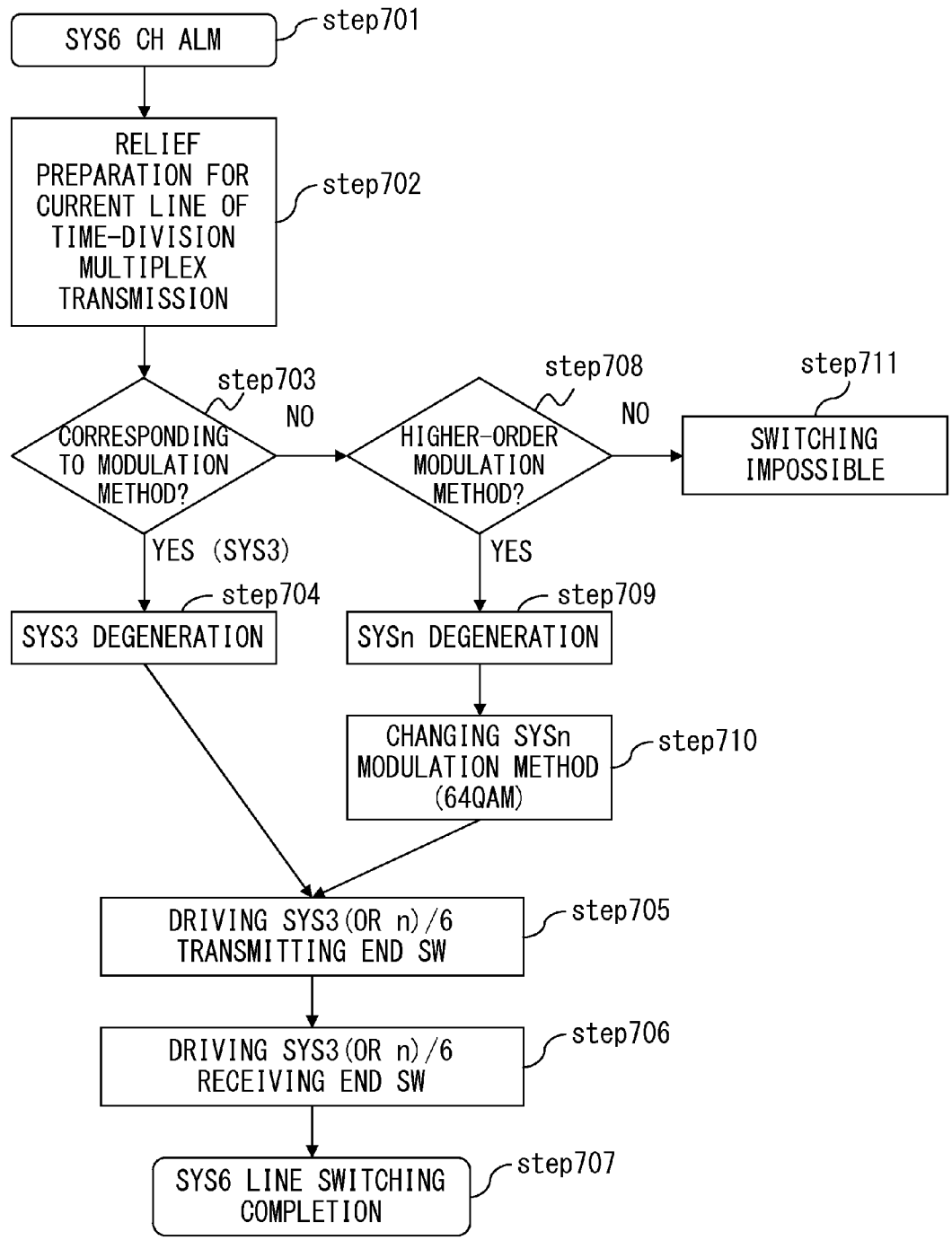
F I G. 7

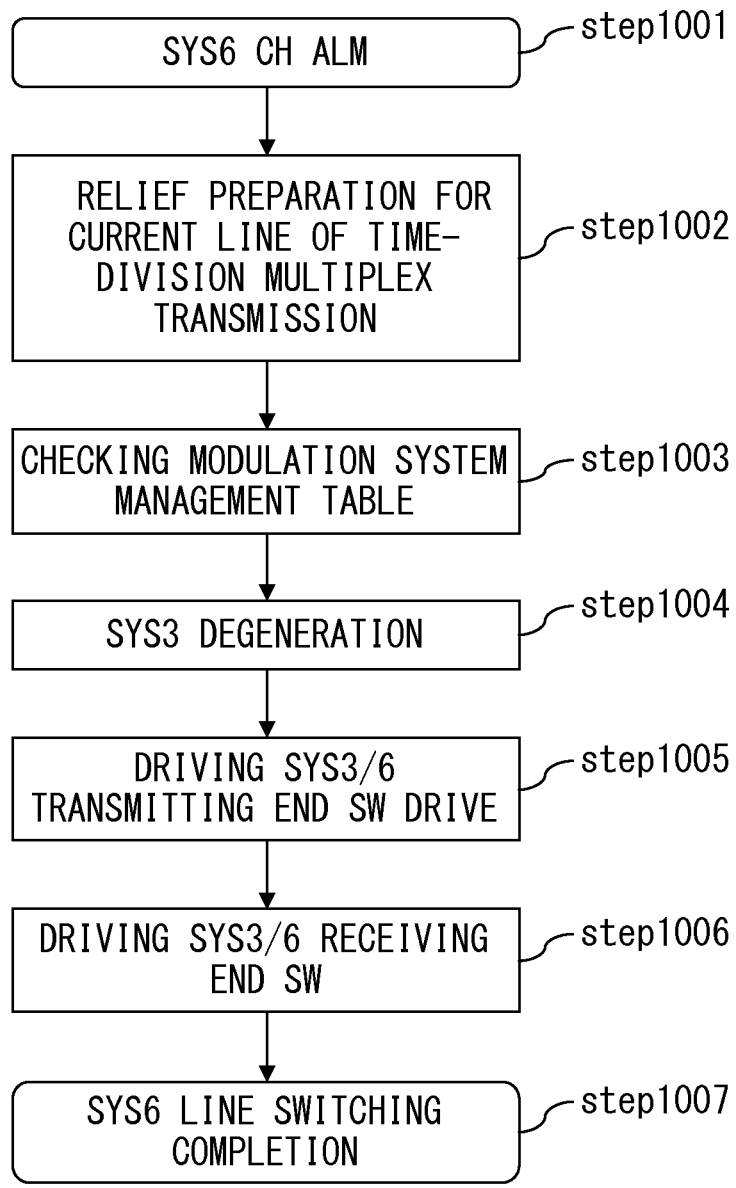
F I G. 1 0

MODULATION METHOD TRANSITION MANAGEMENT TABLE

| | CURRENT t | $t_{-1}$ | $t_{-2}$ | $t_{-3}$ | | | | | | | | | | | | $t_{-(n-3)}$ | $t_{-(n-2)}$ | $t_{-(n-1)}$ | $t_{-n}$ | AVERAGE avg |
|---|---|---|---|---|---|---|---|---|---|---|---|---|---|---|---|---|---|---|---|---|
| SYS1 | 2 | 2 | 2 | 2 | 1 | 2 | 2 | 2 | 1 | 1 | 1 | 1 | 1 | 1 | 1 | 1 | 2 | 1 | 2 | 1.5 |
| SYS2 | 2 | 2 | 2 | 2 | 3 | 2 | 2 | 2 | 3 | 3 | 2 | 3 | 2 | 2 | 2 | 3 | 3 | 2 | 2 | 2.3 |
| SYS3 | 1 | 1 | 1 | 2 | 2 | 2 | 2 | 2 | 3 | 3 | 4 | 4 | 4 | 4 | 4 | 3 | 3 | 2 | 2 | 2.5 |
| SYS4 | 2 | 2 | 2 | 2 | 1 | 2 | 2 | 2 | 1 | 1 | 1 | 1 | 1 | 1 | 1 | 1 | 2 | 2 | 2 | 1.6 |

F I G. 1 1

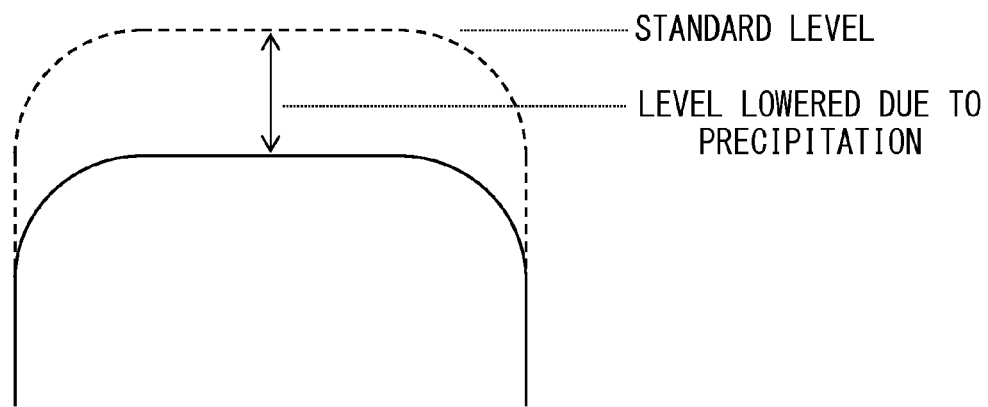
F I G. 1 2

INPUT RECEPTION LEVEL TRANSITION MANAGEMENT TABLE

| | RSL RANK | AVERAGE avg | CURRENT t | $t_{-1}$ | $t_{-2}$ | $t_{-3}$ | . | . | . | . | . | . | . | . |
|---|---|---|---|---|---|---|---|---|---|---|---|---|---|---|
| SYS1 | 1 | -18.2 | -20.0 | -20.0 | -20.0 | -20.0 | -17.0 | -20.0 | -20.0 | -17.0 | -20.5 | -17.0 | -17.0 | -17.0 |
| SYS2 | 3 | -24.9 | -20.5 | -20.5 | -20.5 | -20.5 | -36.5 | -21.0 | -20.5 | -37.5 | -20.5 | -37.5 | -37.5 | -37.5 |
| SYS3 | 4 | -27.4 | -20.0 | -17.0 | -17.0 | -20.5 | -20.5 | -20.0 | -20.0 | -20.0 | -20.0 | -37.0 | -37.5 | -44.0 |
| SYS4 | 2 | -18.7 | -20.0 | -20.0 | -20.0 | -20.0 | -16.5 | -20.0 | -20.0 | -20.0 | -17.0 | -17.0 | -17.0 | -17.0 |

[UNIT : dBm]

| . | . | . | . | . | . | . | . | $t_{-(n-3)}$ | $t_{-(n-2)}$ | $t_{-(n-1)}$ | $t_{-n}$ |
|---|---|---|---|---|---|---|---|---|---|---|---|
| -17.0 | -17.0 | -17.0 | -17.0 | -17.0 | -20.0 | -20.0 | -17.0 | -17.0 | -17.0 | -17.0 | -17.0 |
| -20.5 | -44.0 | -43.5 | -20.5 | -36.5 | -37.0 | -20.5 | -20.5 | -20.5 | -20.5 | -21.0 | -20.5 |
| -44.0 | -17.0 | -17.0 | -37.5 | -362 | -36.5 | -20.0 | -37.0 | -20.0 | -20.0 | -17.0 | -17.0 |
| -17.0 | -17.0 | -17.0 | -17.0 | -20.0 | -20.0 | -20.0 | -20.0 | -20.0 | -20.0 | -17.0 | -20.0 |

F I G. 1 3

MODULATION METHOD TRANSITION MANAGEMENT TABLE

| | QAM RANK | AVERAGE avg | CURRENT t | $t_{-1}$ | $t_{-2}$ | $t_{-3}$ | . | . | . | . | . | . | . | . | . | . | $t_{-(n-3)}$ | $t_{-(n-2)}$ | $t_{-(n-1)}$ | $t_{-n}$ |
|---|---|---|---|---|---|---|---|---|---|---|---|---|---|---|---|---|---|---|---|---|
| SYS1 | 1 | 1.00 | 1 | 1 | 1 | 1 | 1 | 1 | 1 | 1 | 1 | 1 | 1 | 1 | 1 | 1 | 1 | 1 | 1 | 1 |
| SYS2 | 3 | 1.25 | 1 | 1 | 1 | 1 | 2 | 1 | 1 | 1 | 1 | 1 | 1 | 2 | 2 | 1 | 1 | 1 | 1 | 1 |
| SYS3 | 4 | 1.54 | 1 | 1 | 1 | 1 | 1 | 1 | 1 | 3 | 3 | 2 | 2 | 2 | 2 | 2 | 3 | 1 | 1 | 1 |
| SYS4 | 1 | 1.00 | 1 | 1 | 1 | 1 | 1 | 1 | 1 | 1 | 1 | 1 | 1 | 1 | 1 | 1 | 1 | 1 | 1 | 1 |

F I G. 1 4

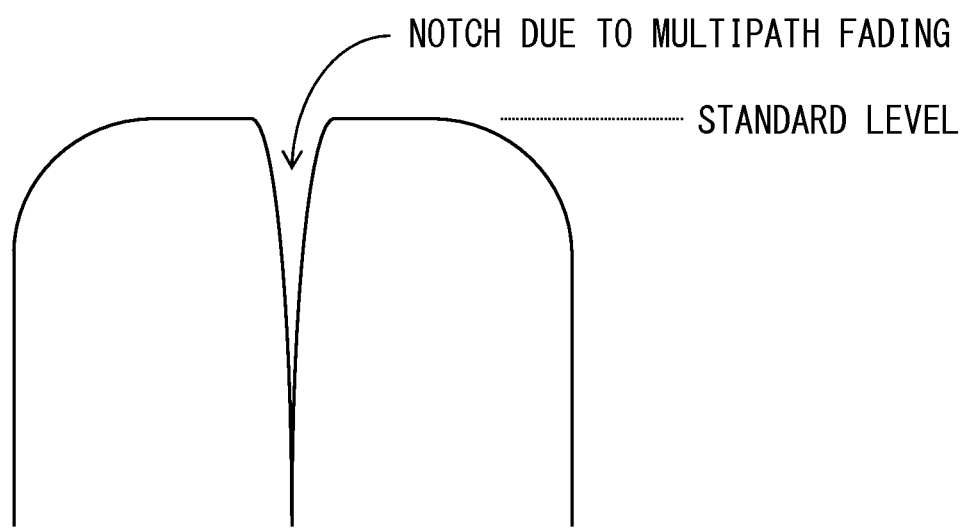
F I G. 1 5

C/N TRANSITION MANAGEMENT TABLE

| | C/N RANK | AVERAGE avg | CURRENT t | $t_{-1}$ | $t_{-2}$ | $t_{-3}$ | · | · | · | · | · | · | · | · | · | · | $t_{-(n-3)}$ | $t_{-(n-2)}$ | $t_{-(n-1)}$ | $t_{-n}$ |
|---|---|---|---|---|---|---|---|---|---|---|---|---|---|---|---|---|---|---|---|---|
| SYS1 | 2 | 39.3 | 40 | 40 | 40 | 40 | · | 40 | 40 | 40 | 40 | 25 | 40 | 40 | · | 40 | 40 | 40 | 40 | 40 |
| SYS2 | 3 | 39.0 | 39 | 39 | 39 | 39 | · | 39 | 39 | 39 | 39 | 39 | 39 | 39 | · | 39 | 39 | 39 | 39 | 39 |
| SYS3 | 1 | 39.8 | 40 | 40 | 40 | 40 | · | 39 | 40 | 40 | 40 | 39 | 40 | 39 | · | 40 | 40 | 40 | 40 | 40 |
| SYS4 | 4 | 38.5 | 40 | 40 | 40 | 40 | · | 40 | 40 | 28 | 40 | 40 | 40 | 30 | · | 40 | 28 | 40 | 40 | 40 |

[UNIT : dBm]

F I G. 1 6

MODULATION METHOD TRANSITION MANAGEMENT TABLE

| | QAM RANK | AVERAGE avg | CURRENT t | $t_{-1}$ | $t_{-2}$ | $t_{-3}$ | . | | | | | | . | | | | . | $t_{-(n-3)}$ | $t_{-(n-2)}$ | $t_{-(n-1)}$ | $t_{-n}$ |
|---|---|---|---|---|---|---|---|---|---|---|---|---|---|---|---|---|---|---|---|---|
| SYS1 | 3 | 1.087 | 1 | 1 | 1 | 1 | | 1 | 1 | 1 | 1 | 1 | | 1 | 3 | 1 | . | 1 | 1 | 1 | 1 |
| SYS2 | 1 | 1.000 | 1 | 1 | 1 | 1 | | 1 | 1 | 1 | 1 | 1 | | 1 | 1 | 1 | . | 1 | 1 | 1 | 1 |
| SYS3 | 1 | 1.000 | 1 | 1 | 1 | 1 | | 1 | 1 | 1 | 1 | 1 | | 1 | 1 | 1 | . | 1 | 1 | 1 | 1 |
| SYS4 | 4 | 1.217 | 1 | 1 | 1 | 1 | | 1 | 1 | 3 | 1 | 1 | | 2 | 1 | 3 | . | 1 | 1 | 1 | 1 |

F I G . 1 7

|  | TOTAL RANK | RSL RANK | QAM RANK |
|---|---|---|---|
| SYS1 | 1 | 1 | 1 |
| SYS2 | 3 | 3 | 3 |
| SYS3 | 4 | 4 | 4 |
| SYS4 | 2 | 2 | 1 |

F I G. 19

|      | TOTAL RANK | C/N RANK | QAM RANK |
|------|------------|----------|----------|
| SYS1 | 3          | 2        | 3        |
| SYS2 | 2          | 3        | 1        |
| SYS3 | 1          | 1        | 1        |
| SYS4 | 4          | 4        | 4        |

F I G. 2 0

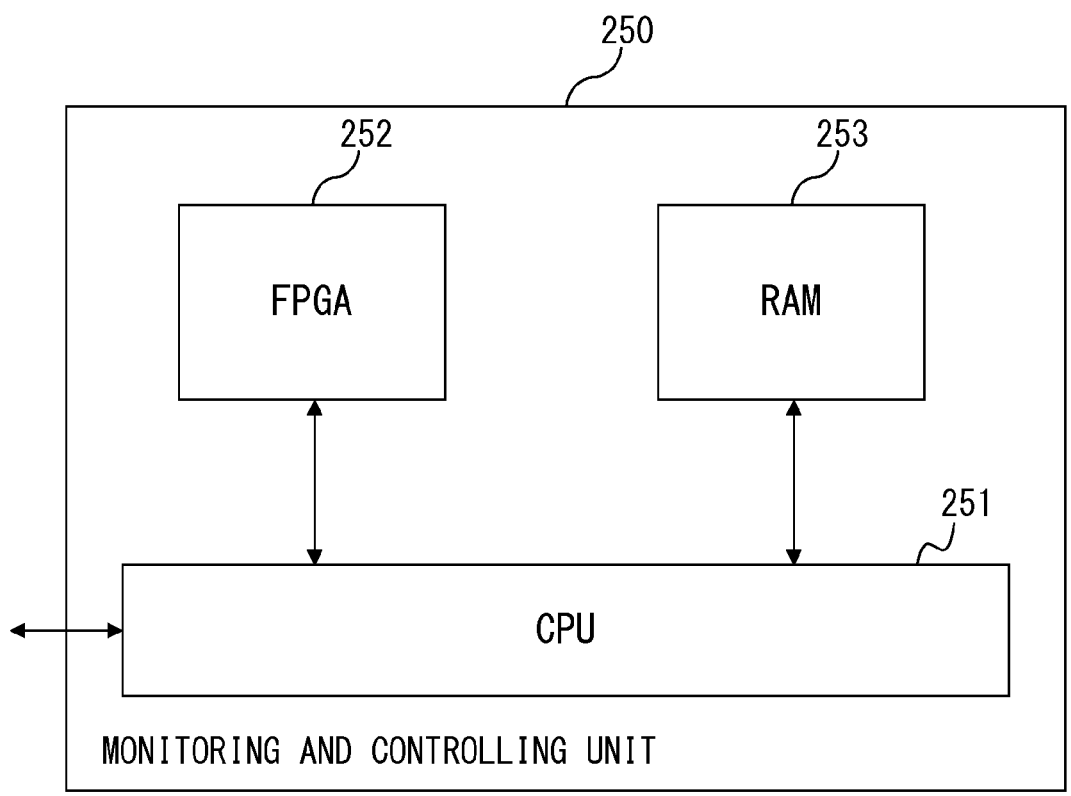
F I G. 2 5

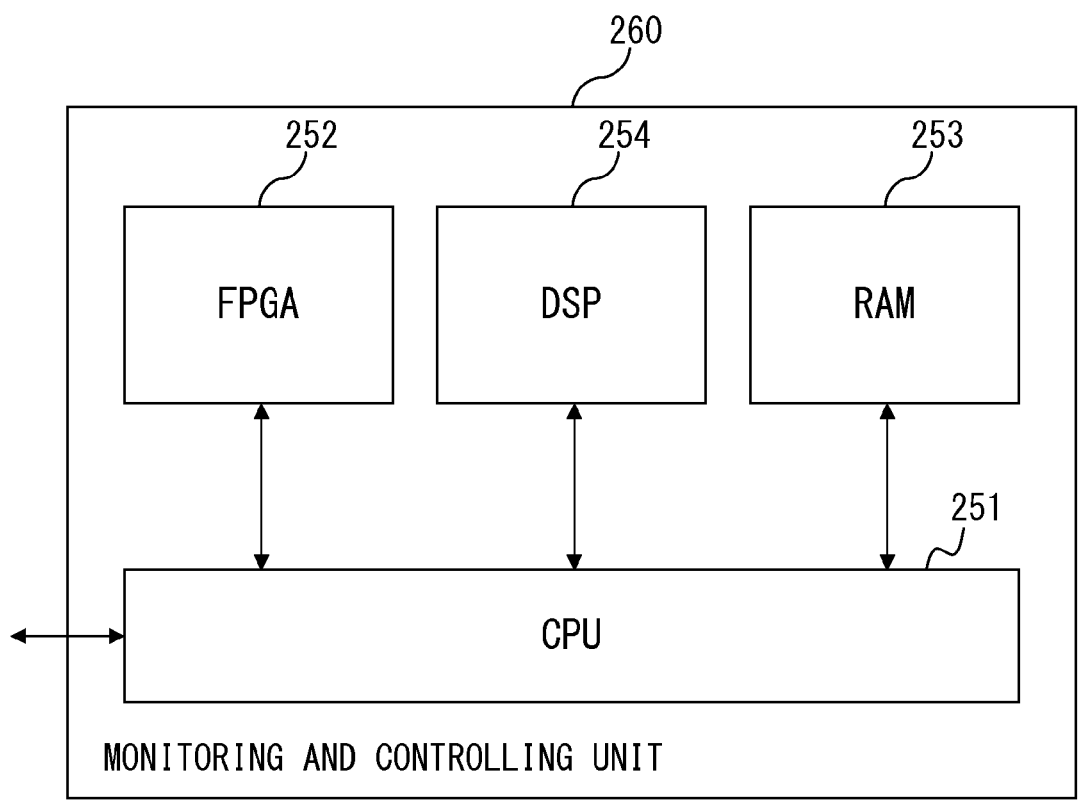
F I G. 2 6

RECEIVING APPARATUS, TRANSMITTING APPARATUS AND LINE CONNECTION SWITCHING METHOD

CROSS-REFERENCE TO RELATED APPLICATIONS

This application is a continuation application of International application PCT/JP2011/052424 filed on Feb. 4, 2011 and designated the U.S., the entire contents of which are incorporated herein by reference.

FIELD

The present invention relates to a receiving apparatus, a transmitting apparatus and a line connection switching method to switch line connection in a wireless communication system that involves both data transmission using a virtual transmission path in which a plurality of wireless lines, the modulation method of which are variable, are virtually consolidated into one, and the time-division multiplex transmission.

BACKGROUND

Due to the use of the Internet Protocol (IP) in the communication network in recent years, the capacity of the communication network has been becoming large. As a result, transmission of a large-capacity data has been required in a wireless communication system as well. Therefore, a wireless communication system which has an Ethernet (registered trademark, the same applies hereinafter) interface and in which large-volume data is transmitted using a virtual transmission path in which a plurality of wireless lines are virtually consolidated into one is becoming the mainstream. A method to virtually integrate a plurality of wireless lines into a virtual transmission path is Link Aggregation, which is defined in Institute of Electrical and Electronic Engineers (IEEE) 802.3ad.

While the wireless communication system having the Ethernet interface becomes the mainstream, the time-division multiplex interface being the existing interface for Synchronous Digital Hierarchy (SDH)/Synchronous Optical Network (SONET) and the like will not be terminated immediately. Therefore, a wireless communication system that involves both the time-division multiplex interface and the Ethernet interface has appeared.

In the wireless communication system that involves both the time-division multiplex interface and the Ethernet interface, there are four conventional techniques described below for performing switching of the line connection, when a failure occurs in a line performing the Ethernet transmission or in a line performing the time-division multiplex transmission.

First, in a wireless communication system in which the path at the connection position of the network with the Ethernetwork is connected redundantly by the current system and the backup system, a technique to switch the path at the connection position from the current system to the backup system has been known.

Next, a technique targeted at a communication network in which the connection apparatus on the Ethernet side where Link Aggregation is used and the connection apparatus on the SDH/SONET side are connected redundantly has been known. In this technique, in such a communication network, a network apparatus having the interface of the SDH/SONET side is provided between the connection apparatus on the Ethernet side and the connection apparatus on the SDH/SO-NET side. Then, the network apparatus reports whether a plurality of lines used for Link Aggregation are the operating system or the non-operating system to the communication apparatus on the Ethernet side.

In addition, a technique related to the switching control between a current system interface and a backup system interface having different types of network interface, namely the Ethernet interface and the SDH/SONET interface, has been known. In this technique, by converting Automatic Protection Switch (APS) information for Ethernet and APS for SDH/SONET, the reception main signal is switched between the signal received by the current system interface and the signal received by the backup system interface.

Then, in a network that involves a plurality of types of signals such as Ethernet and SDH/SONET and the like, a technique to provide one backup line including a multi-rate reproduction relay board that is capable of handling the transmission speeds of a plurality of types of signals has been known. In this technique, when a failure occurs in a line in which a certain type of signal is transmitted, the transmission speed of the interface board is set to the transmission speed of the signal type, and switching is performed from the line having the failure to the backup line.

In a wireless communication system in which time-division multiplex transmission is performed, when a failure occurs in the current line, data transmission is performed by switching the line connection from the current line in which the failure has occurred to a wireless line provided as a backup line for the current line. That is, in a wireless communication system in which time-division multiplex transmission is performed, at least one unused backup line is provided in advance for the current line to give aid to the failure in the current line.

However, securing the backup line while maintaining it in the unused condition in preparation for the occurrence of the failure in the current line of time-division multiplex transmission is problematic in terms of the efficient use of the frequency, large-volume data transmission and economic efficiency.

Therefore, in the wireless communication system that involves both the time-division multiplex transmission and the Ethernet transmission, when there is no failure occurring in the current line of the time-division multiplex transmission, the use of the unused backup line as a wireless line that constitute the virtual transmission path of the Ethernet transmission may be considered.

As described above, in the Ethernet transmission, to transmit large-volume data, a virtual transmission path in which a plurality of virtual lines are virtually consolidated into one is used. A method to virtually consolidate a plurality of wireless lines into a virtual transmission path is Link Aggregation.

The operation of Link Aggregation includes a degenerate operation and an expansion operation. The degenerate operation of Link Aggregation is an operation to stop the assignment of the frame to a line in which a failure has occurred and to change the frame distribution rule to assign the frame to other lines in which no failure has occurred when a failure occurs in a line constituting the virtual transmission path, for example. In addition, the expansion operation of Link Aggregation is an operation to change the frame distribution rule so that, when a line in which a failure has occurred recovers for example, the frame is assigned the respective lines constituting the virtual transmission path including the recovered line.

In addition, in the Ethernet transmission, to realize the transmission of large-volume data, it is desirable to use Adaptive Coding and Modulation (ACM).

Adaptive Coding and Modulation is a method to make the coding method and the modulation method of the wireless communication system dynamically variable according to the condition of the transmission path.

For example, when the condition of the transmission path deteriorates due to rain and the like, change is performed to 64-Quadrature Amplitude Modulation which is a lower-order modulation than 256-Quadrature Amplitude Modulation (QAM). Accordingly, the transmission of data for which no delay is allowed, such as audio data and video data for example, may be guaranteed.

Meanwhile, when the condition of the transmission path is good, change is performed to 256-Quadrature Amplitude Modulation (QAM) which is a higher-order modulation than Quadrature Amplitude Modulation or Quadrature Phase Shift Keying (4PSK). This makes it possible to increase the number of modulation bits per symbol, and to realize the transmission of large-volume data.

When the modulation methods of the respective wireless lines constituting the virtual transmission path in the Ethernet transmission are different, it is possible to perform assignment control of the traffic volume of the respective wireless lines according to the modulation methods of the respective wireless lines. Therefore, in the Ethernet transmission, to realize the transmission of large-volume data, it is desirable to combine and use Link Aggregation and Adaptive Coding and Modulation.

In the Ethernet transmission using Link Aggregation and Adaptive Coding and Modulation as described above, the transmission capacity of the virtual transmission path in which a plurality of wireless lines are virtually bundled into one wireless line is determined by the number of wireless lines and the modulation method. For example, when the carrier path condition of the wireless lines constituting the transmission path deteriorates or when a device failure and the like of the wireless lines occurs, there is a need to downgrade the modulation method to a lower order, or to reduce the number of wireless lines, and as a result, the throughput decreases.

Therefore, when the backup line of the time-division multiplex transmission is unused, the use of the unused backup line as a line constituting the virtual transmission path in the Ethernet transmission, to increase the number of wireless lines constituting the virtual transmission path may be considered. When it is possible to increase the number of lines of the wireless lines constituting the virtual transmission path, the transmission capacity of the virtual transmission path may be increased, and the decrease in the throughput as described above may be prevented.

However, in the time-division multiplex transmission, it is desirable to perform the transmission with a stable line quality by fixing the modulation method.

As described above, for the wireless line used as both a wireless line constituting the virtual transmission path of the Ethernet transmission and a backup line of the time-division multiplex transmission, when it is used for the Ethernet transmission, realization of data forwarding in a larger capacity using Link Aggregation and Adaptive Coding and Modulation is required. Meanwhile, when it is used for the time-division multiplex transmission, stabilization of the line quality of the wireless line is required.

While the Ethernet transmission in which Link Aggregation and Adaptive Coding and Modulation are used is described above as an example, a similar problem occurs regarding data transmission using a virtual transmission path in which a plurality of wireless lines, modulation methods of which are variable, are virtually consolidated into one line.

PRIOR ART DOCUMENTS

Patent Documents

Patent document 1: International Publication Pamphlet No. WO2005/079015
Patent document 2: Japanese Laid-open Patent Publication No. 2008-177941
Patent document 3: Japanese Laid-open Patent Publication No. 2009-10441
Patent document 4: Japanese Laid-open Patent Publication No. 2008-258701

SUMMARY

According to an aspect of the embodiments, a receiving apparatus in a wireless communication system that involves both data transmission using a virtual transmission path in which a plurality of wireless lines of which modulation method is variable are virtually consolidated into one, and time-division multiplex transmission, the receiving apparatus includes a releasing unit configured to release, when a failure occurs in a current line used in the time-division multiplex transmission, one wireless line in the plurality of wireless lines constituting the virtual transmission path from the virtual transmission path; a demodulation unit configured to change a modulation method used for demodulation of the one wireless line released from the virtual transmission path by the releasing unit to a modulation method used in the time-division multiplex transmission; and a switching unit configured to switch line connection from the current line in which the failure has occurred to the one wireless line of which modulation method has been changed by the demodulation unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a configuration diagram of a wireless communication system of the first embodiment;

FIG. 1B is a configuration diagram of a wireless communication system of the first embodiment;

FIG. 2 is a diagram illustrating a configuration example of a monitoring and controlling unit of a wireless communication apparatus of the first embodiment;

FIG. 3B is a redundancy switching sequence diagram of time-division multiplex transmission of the first embodiment.

FIG. 4 is a redundancy switching flowchart of time-division multiplex transmission of the first embodiment;

FIG. 5A is a configuration diagram of a wireless communication system of the second embodiment;

FIG. 6A is a redundancy switching sequence diagram of time-division multiplex transmission of the second embodiment;

FIG. 7 is a redundancy switching flowchart of time-division multiplex transmission of the second embodiment;

FIG. 10 is a redundancy switching flowchart of time-division multiplex transmission of the third embodiment;

FIG. 11 is a diagram illustrating the temporal transition of the modulation method of the wireless lines constituting the virtual transmission path in the first example of the fourth embodiment;

FIG. 12 is an illustration diagram of a flat fading spectrum;

FIG. 13 is a diagram illustrating the temporal transition of the reception input level of the wireless lines constituting the virtual transmission path in the second example of the fourth embodiment;

FIG. 14 is a diagram illustrating the temporal transition of the modulation method of the wireless lines constituting the virtual transmission path in the second example of the fourth embodiment;

FIG. 15 is an illustration diagram of a multipath fading spectrum;

FIG. 16 is a diagram illustrating the temporal transition of the Carrier to Noise ratio of the wireless lines constituting the virtual transmission path in the third example of the fourth embodiment;

FIG. 17 is a diagram illustrating the temporal transition of the modulation method of the wireless lines constituting the virtual transmission path in the third example of the fourth embodiment;

FIG. 19 is a line quality rank management table of the second example of the fourth embodiment;

FIG. 20 is a line quality rank management table of the third example of the fourth embodiment;

FIG. 25 is a diagram illustrating a hardware configuration example of the monitoring and controlling unit of the wireless communication apparatus of the first through third embodiments; and FIG. 26 is a diagram illustrating a hardware configuration example of the monitoring and controlling unit of the wireless communication apparatus of the fourth and fifth embodiments.

DESCRIPTION OF EMBODIMENTS

Figure 3A:
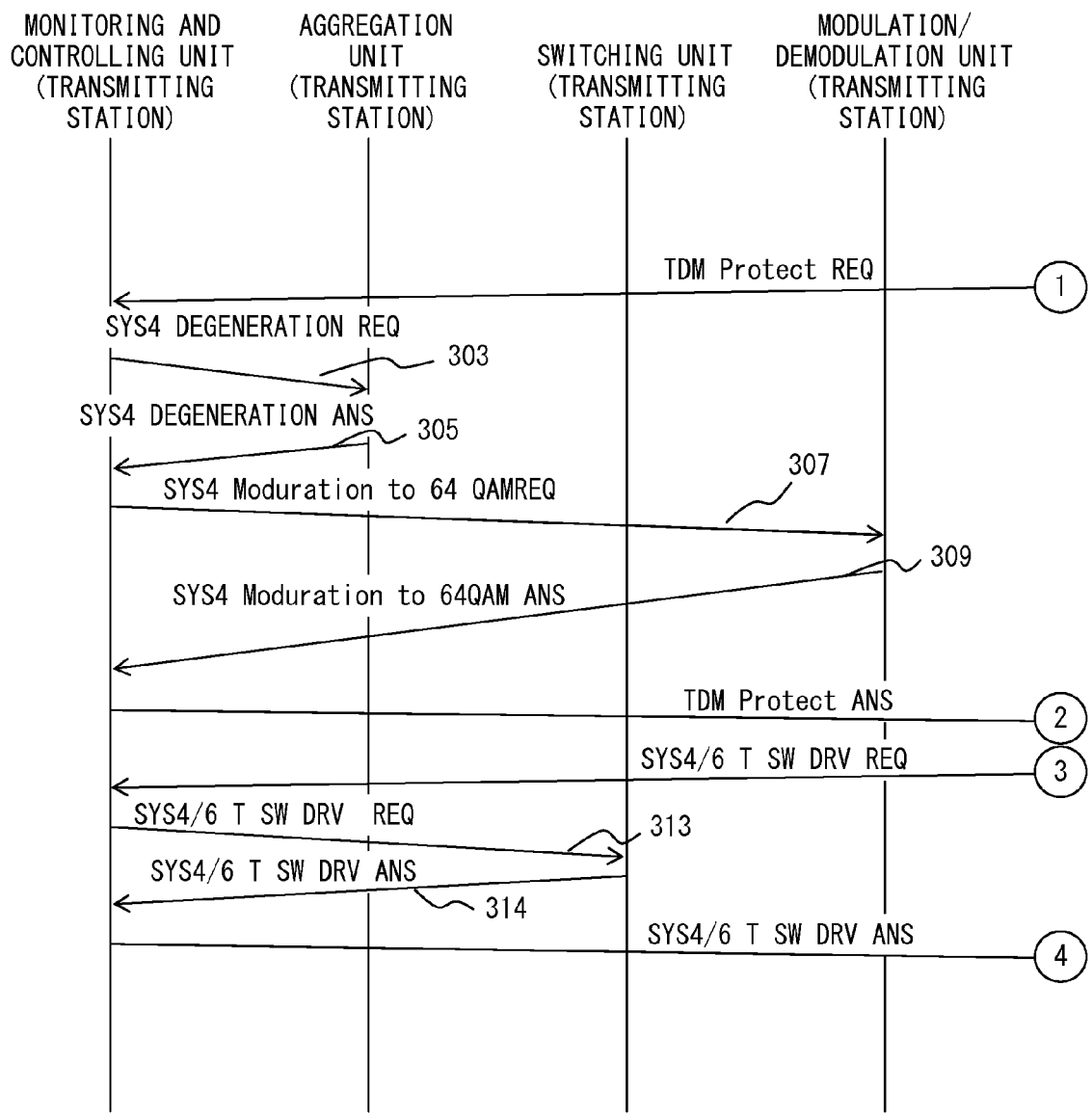
FIG. 3A is a redundancy switching sequence diagram of time-division multiplex transmission of the first embodiment.

Hereinafter, the embodiments are described in detail referring to the drawings.

In the embodiments for implementing the invention, as an example of data transmission using the virtual transmission path in which a plurality of wireless lines of which modulation method is variable are virtually consolidated into one, Ethernet transmission using Link Aggregation and Adapting Coding and Modulation is taken and explained.

<First Embodiment>

FIG. 1 including FIGS. 1A and 1B is an configuration example of a wireless communication system of the first embodiment of the present invention involving both the Ethernet transmission and the time-division multiplex transmission. FIG. 1 illustrates, as an example, a pair of wireless communication apparatuses 11 and 12 including wireless communication systems SYS1-SYS7 corresponding respectively to seven wireless lines 1-7.

In the seven wireless lines included in the wireless communication system in FIG. 1, the wireless lines 1-4 are lines that may constitute a virtual transmission path of the Ethernet transmission.

In addition, the lines 5-7 are the current lines of the time-division multiplex transmission, and the wireless line 4 is a line that may be used as a backup line of the time-division multiplex transmission. Then, the 3+1 redundancy configuration of the time-division multiplex is established by these wireless lines 4-7.

Thus, the wireless line 4 may be used as a wireless line that constitutes a part of the virtual transmission path of the Ethernet transmission, and also may be used as a backup line of the wireless lines 5-7 being the current lines of the time-division multiplex transmission.

The wireless communication apparatus 11 in FIG. 1 includes, for the SYS1-SYS4 in which the Ethernet transmission may be performed, a aggregation unit 1101, baseband signal processing units 1111-1114, modulation/demodulation units 1131-1134, and transmission/reception units 1141-1144. In addition, the wireless communication apparatus 12 includes, for the SYS1-SYS4 in which the Ethernet transmission may be performed, a aggregation unit 1201, baseband signal processing units 1211-1214, modulation/demodulation units 1231-1234, and transmission/reception units 1241-1244.

The baseband signal processing units 1111-1114 and 1211-1214 performs processing in the baseband of the transmitted/received data signal. The modulation/demodulation unit 1131-1134 and 1231-1234 modulate or demodulate the transmitted/received data signal by Adaptive Coding and Modulation control. The transmission/reception units 1141-1144 and 1241-1244 transmit or receive the data signal transmitted/received with another wireless communication apparatus. The aggregation units 1101 and 1201 change the assignment of the Ethernet frame in the SYS1-SYS4 by the degeneration/expansion operations of Link Aggregation.

The wireless communication apparatus 11 in FIG. 1 includes, for the SYS5-SYS7 in which the time-division multiplex transmission is performed, baseband signal processing units 1115-1117, modulation/demodulation 1135-1137, and transmission/reception units 1145-1147. In addition, the wireless communication apparatus 12 includes, for the SYS5-SYS7 in which the time-division multiplex transmission is performed, baseband signal processing units 1215-1217, modulation/demodulation units 1235-1237, and transmission/reception units 1245-1247.

The baseband signal processing units 1115-1117 and 1215-1217 performs processing in the baseband of the transmitted/received data signal in the time-division multiplex transmission. The modulation/demodulation unit 1135-1137 and 1235-1237 modulate or demodulate the transmitted/received data signal by 64-Qadrature Amplitude Modulation as an example of the modulation method. The transmission/reception units 1145-1147 and 1245-1247 transmit or receive the data signal transmitted/received with another wireless communication apparatus.

The wireless communication apparatus 11 in FIG. 1 includes a switching unit 1121 that performs switching of the system between the SYS5-SYS7 corresponding to the current lines in the time-division multiplex transmission and the SYS4 corresponding to the backup line. In addition, the wireless communication apparatus 12 includes a switching unit 1221 that performs switching of the system between the SYS5-SYS7 corresponding to the current lines in the time-division multiplex transmission and the SYS4 corresponding to the backup line.

As illustrated in FIG. 1, the aggregation unit 1101, the baseband signal processing units 1111-1117, the switching unit 1121, the modulation/demodulation 1131-1137, and the transmission/reception units 1241-1247 of the wireless communication apparatus 11 are connected to the monitoring and controlling unit 1151. In addition, the aggregation unit 1201, the baseband signal processing units 1211-1217, the switching unit 1221, the modulation/demodulation 1231-1237, and the transmission/reception units 1241-1247 of the wireless communication apparatus 12 are connected to the monitoring and controlling unit 1251.

The monitoring and controlling units 1151 and 1251 monitor and control the operation and condition of the connected units.

In the first embodiment, as illustrated in the example diagram of the monitoring and controlling unit 20 in FIG. 2, the monitoring and controlling units 1151 and 1251 include a controlling unit 21, a channel switching unit 22, a wireless environment measuring unit 23, and a storage unit 24.

The channel switching unit 22 is a unit that performs judgment required when switching the line connection from the current line of the time-division multiplex transmission to the backup line. For example, whether or not there is a need for relief preparation for the current line of the time-division multiplex transmission, whether or not relief preparation for the current line has been completed, whether or not driving of the switch at the transmitting end side and driving of the switch at the receiving end side have been completed, and the like, are judged. The channel switching unit 22 is a Field Programmable Gate Array (FPGA) for example.

The wireless environment measuring unit 23 is a unit that measures the wireless environment of each wireless line, which is used as a reference for switching the line connection of the wireless line and changing the modulation method of the wireless communication system. The wireless environment measuring unit 23 is a Field Programmable Gate Array (FPGA) for example.

The controlling unit 21 is a unit that controls the operation of the aggregation unit, the baseband processing units, the switching units, the modulation/demodulation units, and transmission/reception units, based on the judgment by the channel switching unit 22 and the wireless environment measuring unit 23. The controlling unit 21 is a Central Processing Unit (CPU) for example.

The storage unit 24 is a Random Access Memory (RAM) for example. The storage unit 24 stores a communication carrier condition management table 241 for managing the transmission method and the usage condition of each system.

Meanwhile, the wireless communication apparatus 11 and 12 includes a branching unit including a band-pass filter and antenna duplexer, while it is not illustrated in the drawing so as to facilitate the understanding of the flow of the signal transmitted/received in the seven wireless lines 1-7 corresponding to the SYS1-SYS7. Therefore, in the wireless communication apparatus 11, the signal transmitted/received in the wireless lines 1-7 is transmitted/received in the transmission/reception units 1141-1147 via the branching unit provided in the wireless communication apparatus 11. In addition, in the wireless communication apparatus 12, the signal transmitted/received in the wireless lines 1-7 is transmitted/received in the transmission/reception units 1241-1247 via the branching unit provided in the wireless communication apparatus 12.

In the configuration example of the wireless communication system of the first embodiment in FIG. 1, a method to switch the line connection from the current line to a backup line when a failure occurs in the current line of the time-division multiplex transmission is explained using a redundancy switching sequence diagram of time-division multiplex transmission in FIG. 3 including FIGS. 3A and 3B and a redundancy switching flowchart of time-division multiplex transmission in FIG. 4.

In the configuration example of the wireless communication system of the first embodiment in FIG. 1, for example, the wireless communication apparatus 11 is assumed as a transmitting station, and the wireless communication apparatus 12 is assumed as a receiving station. Then, it is assumed that the virtual transmission path of the Ethernet transmission is established by the wireless lines 1-4, and that Adapting Coding and Modulation control is performed for the modulation methods in those wireless lines. In addition, it is assumed that time-division multiplex transmission is performed with the wireless lines 5-7 being the current lines, and that the modulation methods in those wireless lines are 64-Quadrature Amplitude Modulation. It is assumed in this case that a failure occurs in the wireless line 6.

In step 401 in FIG. 4, the modulation/demodulation unit 1236 of the wireless communication apparatus 12 detects the occurrence of a failure in wireless line 6 from a received data signal. Then, the modulation/demodulation unit 1236 transmits an alarm ALM that reports the occurrence of a failure in the wireless line 6 to the monitoring and controlling unit 1251 (arrow 301 in FIG. 3).

In step 402 in FIG. 4, upon receiving the alarm ALM, the monitoring and controlling unit 1251 makes a judgment that a relief preparation for the current line of the time-division multiplex transmission is needed. Then, the monitoring and controlling unit 1251 makes a request for the relief preparation for the current line of the time-division multiplex to the monitoring and controlling unit 1151 of the wireless communication apparatus 11 (arrow 302 in FIG. 3).

In step 403 in FIG. 4, upon receiving the relief preparation request for the current line, the monitoring and controlling unit 1151 of the wireless communication apparatus 11 makes a request for the degeneration operation of Link Aggregation for the SYS4 to the aggregation unit 1101, to release the wireless line 4 from the virtual transmission path (arrow 303 in FIG. 3). In addition, the monitoring and controlling unit 1251 of the wireless communication apparatus 12 makes a request for the degeneration operation of Link Aggregation for the SYS4 to the aggregation unit 1201, to release the wireless line 4 from the virtual transmission path (arrow 304 in FIG. 3).

Upon receiving the request from the monitoring and controlling unit 1151, the aggregation unit 1101 of the wireless communication apparatus 11 stops the assignment of the Ethernet frame to the SYS4 by the degeneration operation of Link Aggregation. Then, the aggregation unit 1101 reports the completion of the degeneration operation for the SYS4 to the monitoring and controlling unit 1151 (arrow 305 in FIG. 3). Information about the stop of the assignment of the Ethernet frame to the SYS4 is stored in the communication carrier condition management table 241 of the monitoring and controlling unit 1151.

Meanwhile, upon receiving the request from the monitoring and controlling unit 1251, the aggregation unit 1201 of the wireless communication apparatus 12 stops the assignment of the Ethernet frame to the SYS4 by the degeneration operation of Link Aggregation. Then, the aggregation unit 1201 reports the completion of the degeneration operation for the SYS4 to the monitoring and controlling unit 1251 (arrow 306 in FIG. 3). Information about the stop of the assignment of the Ethernet frame to the SYS4 is stored in the communication carrier condition management table 241 of the monitoring and controlling unit 1251.

When the degeneration operation for the SYS4 is completed, advancement to step 404 in FIG. 4 is performed. That is, the monitoring and controlling unit 1151 of the wireless communication apparatus 11 makes a request to the modulation/demodulation unit 1134 for changing the modulation method used for modulation in the SYS4 in which Adaptive Coding and Modulation control is performed to 64-Quadrature Amplitude Modulation used for the time-division multiplex transmission (arrow 307 in FIG. 3). In addition, the monitoring and controlling unit 1251 of the wireless communication apparatus 12 makes a request to the modulation/demodulation unit 1234 for changing the modulation method used for demodulation in the SYS4 in which Adaptive Coding and Modulation control is performed to 64-Quadrature Amplitude Modulation used for the time-division multiplex transmission (arrow 308 in FIG. 3).

Upon receiving the change request for the modulation method from the monitoring and controlling unit 1151, the modulation/demodulation unit 1134 of the wireless communication apparatus 11 changes the modulation method used for the modulation to 64-Quadrature Amplitude Modulation. Then, the modulation/demodulation unit 1134 reports the completion of the modulation method change to the monitoring and controlling unit 1151 (arrow 309 in FIG. 3).

Meanwhile, upon receiving the change request for the modulation method from the monitoring and controlling unit 1251, the modulation/demodulation unit 1234 of the wireless communication apparatus 12 changes the modulation method used for the demodulation to 64-Quadrature Amplitude Modulation. Then, the modulation/demodulation unit 1234 of the SYS4 reports the completion of the modulation method change to the monitoring and controlling unit 1251 (arrow 310 in FIG. 3).

Upon receiving the completion of the modulation method change for the SYS4, the monitoring and controlling unit 1151 of the wireless communication apparatus 11 makes a judgment that the relief preparation for the current line of the time-division multiplex transmission has been completed. Then, the monitoring and controlling unit 1151 reports the completion of the relief preparation for the current line of the time-division multiplex transmission to the monitoring and controlling unit 1251 of the wireless communication apparatus 12 (arrow 311 in FIG. 3).

When the monitoring and controlling unit 1251 of the wireless communication apparatus 12 receives the report of the completion of the relief preparation for the current line of the time-division multiplex transmission, advancement to step 405 in FIG. 4 is performed. That is, the monitoring and controlling unit 1251 makes a judgment that the switch needs to be driven so as to switch the system at the transmitting end side between the SYS4 and the SYS6. Then, the monitoring and controlling unit 1251 of the wireless communication apparatus 12 makes a request to the monitoring and controlling unit 1151 of the wireless communication apparatus 11 for driving the switch to switch the system at the transmitting end side between the SYS4 and the SYS6 (arrow 312 in FIG. 3).

Upon receiving the driving request for the switch at the transmitting end side, the monitoring and controlling unit 1151 of the wireless communication apparatus 11 makes a request to the switching unit 1121 for driving the switch to perform the switching of the system at the transmitting end side between the SYS4 and SYS6 (arrow 313 in FIG. 3). The switching unit 1121 drives the switch to perform the switching of the system at the transmitting end side between the SYS4 and the SYS6 so that the data signal processed by the baseband signal processing unit 1116 is modulated by the modulation/demodulation unit 1134 and transmitted by the transmission/reception unit 1144. Then, the switching unit 1121 reports the completion of the driving of the switch to perform the switching of the system at the transmitting end side between the SYS4 and the SYS6 to the monitoring and controlling unit 1151 (arrow 314 in FIG. 3).

The monitoring and controlling unit 1151 that received the report makes a judgment that the driving of the switch to perform the switching of the system at the transmitting end side between the SYS4 and the SYS6 has been completed. Then, the monitoring and controlling unit 1151 reports the completion of the driving of the switch at the transmitting end side to the monitoring and controlling unit 1251 of the wireless communication apparatus 12 (arrow 315 in FIG. 3).

When the monitoring and controlling unit 1251 of the wireless communication apparatus 12 receives the report of the completion of the driving of the switch at the transmitting end side, advancement to step 406 in FIG. 4 is performed. That is, the monitoring and controlling unit 1251 makes a judgment that the switch needs to be driven so as to switch the system at the receiving end side between the SYS4 and the SYS6. Then, the monitoring and controlling unit 1251 makes a request to the switching unit 1221 for driving the switch at the receiving end side (arrow 316 in FIG. 3). The switching unit 1221 that received the request drives the switch so that when the data signal transmitted via the SYS4 of the wireless apparatus 11 is received by the transmission/reception unit 1244 and demodulated by the modulation/demodulation unit 1234, it is signal-processed by the baseband signal processing unit 1216. Then, the completion of the driving of the switch to switch the system at the receiving end side between the SYS4 and the SYS6 is reported to the monitoring and controlling unit 1251 (arrow 317 in FIG. 3). Then, the series of switching operations for the SYS6 corresponding to the wireless line 6 in which a failure has occurred is completed (step 407 in FIG. 4).

As described above, in the wireless communication system of the first embodiment, when no failure has occurred in the current line of the time-division multiplex transmission, the wireless line that may be used as a backup line of the time-division multiplex transmission is used as a wireless line constituting the virtual transmission path of the Ethernet transmission. Therefore, according to the wireless communication system of the first embodiment of the present invention, when the backup line of the time-division multiplex transmission is unused, the number of lines of the wireless lines constituting the virtual transmission path may be increased, and the transmission capacity of the virtual transmission path may be increased.

Then, when a failure occurs in the current line of the time-division multiplex transmission, the wireless line used as a backup line is released from the virtual transmission path of the Ethernet transmission, its modulation method performed by Adaptive Coding and Modulation control is changed to the modulation method used in the time-division multiplex transmission, and it is used as a backup line. Therefore, according to the wireless communication system of the first embodiment of the present invention, without securing a backup line of the time-division multiplex transmission while keeping it unused, a stable line quality required for the wireless line of the time-division multiplex transmission can be realized.

<Second Embodiment>

Figure 5B:
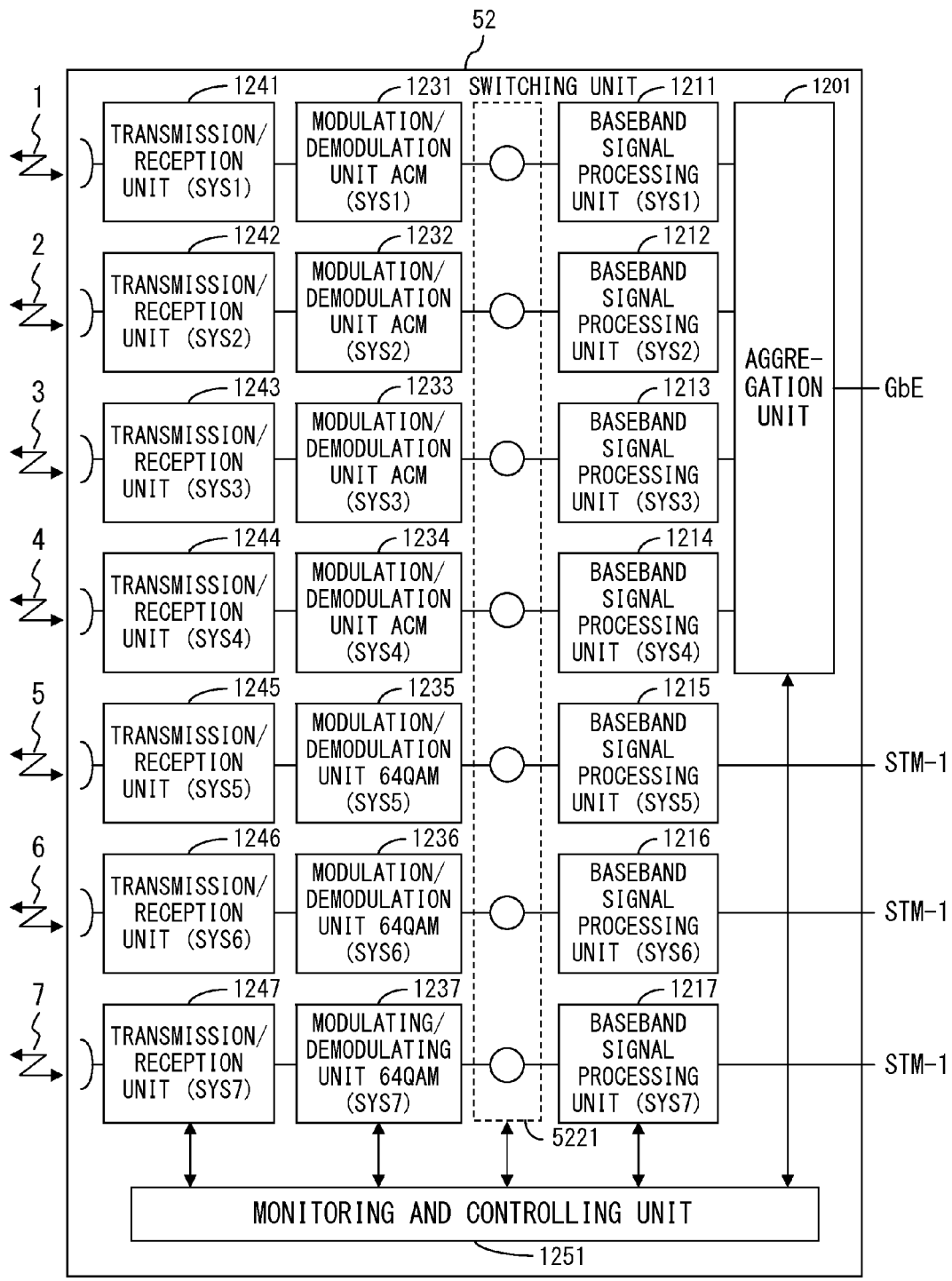
FIG. 5B is a configuration diagram of a wireless communication system of the second embodiment.

FIG. 5 including FIGS. 5A and 5B is a configuration example of a wireless communication system of the second embodiment of the present invention that involves both time-division multiplex transmission and Ethernet transmission. FIG. 5 illustrates a pair of wireless communication apparatuses 51 and 52 including systems SYS1-SYS7 respectively corresponding to seven wireless lines. Meanwhile, the same numerals are assigned to the same units as in the wireless communication apparatus of the wireless communication system of the first embodiment illustrated in FIG. 1.

In the first embodiment described above, a particular wireless line in the plurality of wireless lines constituting the virtual transmission path of the Ethernet transmission is set in advance so that it may be used as a backup line of the time-division multiplex transmission. Then, when a failure occurs in the current line of the time-division multiplex transmission, a degenerate operation of Link Aggregation is performed, the particular wireless line is released from the virtual transmission path of the Ethernet transmission, and the modulation method of the particular wireless line is changed to the modulation method used in the time-division multiplex transmission. The one particular wireless line in the plurality of wireless lines constituting the virtual transmission path of the Ethernet transmission is used as a backup line of the time-division multiplex transmission as described above.

In contrast, in the second embodiment, the setting is made so that any one wireless line in the plurality of wireless lines constituting the virtual transmission path of the Ethernet transmission may be used as a backup line of the time-division multiplex transmission. Then, when a failure occurs in the current line of the time-division multiplex transmission, a wireless line of which current modulation method corresponds to the one used in the time-division multiplex transmission is selected as a backup line from the plurality of wireless lines constituting the virtual transmission line. Then, the degeneration of Link Aggregation is performed, to release the selected wireless line from the virtual transmission path of the Ethernet transmission and use it as a backup line of the time-division multiplex transmission.

Then, as illustrated in FIG. 5, the wireless communication apparatus 51 of the wireless communication system of the second embodiment includes a switching unit 5121. In addition, the wireless communication apparatus 52 includes a switching unit 5221.

The switching units 5121 and 5221 performs switching of the system between the SYS1-SYS4 corresponding to wireless lines 1-4 that may constitute the virtual transmission path of the Ethernet transmission and the SYS5-SYS7 corresponding to wireless lines 5-7 being the current lines of the time-division multiplex transmission.

Meanwhile, the monitoring and controlling unit 1151 of the wireless communication apparatus 51 of the wireless communication system of the second embodiment includes a controlling unit 21, a channel switching unit 22, a wireless environment measuring unit 23, and a storage unit 24 storing the communication carrier condition management table 241, as illustrated in the example diagram of the monitoring and controlling unit 20 in FIG. 2.

Figure 6B:
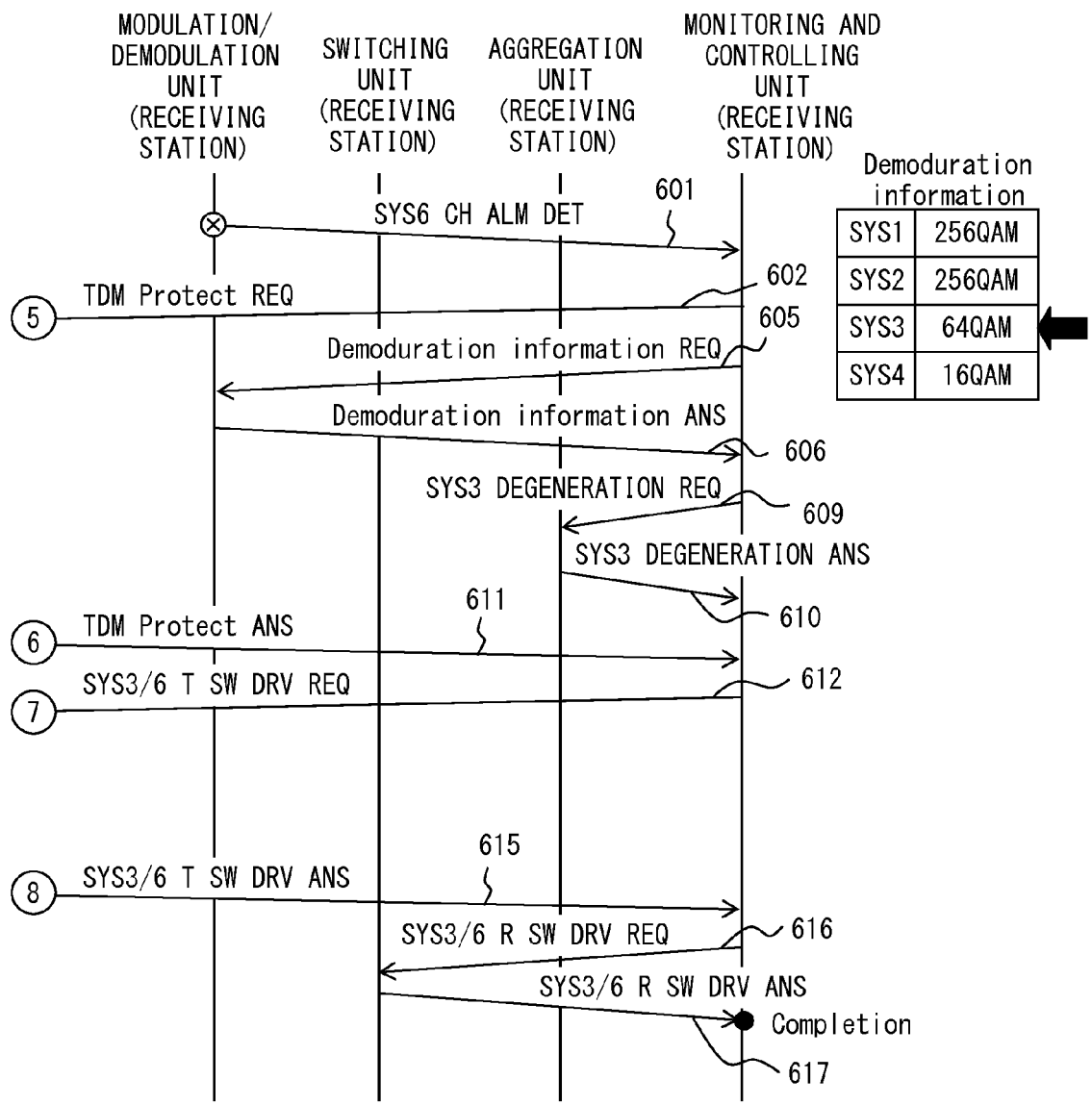
FIG. 6B is a redundancy switching sequence diagram of time-division multiplex transmission of the second embodiment.

A method for switching the line connection from the current line to a backup line when a failure occurs in the current line of the time-division multiplex in the wireless communication system in the second embodiment is explained using the redundancy switching sequence diagram of time-division multiplex transmission in FIG. 6 including FIGS. 6A and 6B and the redundancy switching flowchart of time-division multiplex transmission in FIG. 7.

In the configuration example of the wireless communication system of the second embodiment in FIG. 5, for example, the wireless communication apparatus 51 is assumed as a transmitting station, and the wireless communication apparatus 52 is assumed as a receiving station. Then, it is assumed that the virtual transmission path of the Ethernet transmission is established by the wireless lines 1-4, and that Adapting Coding and Modulation control is performed for the modulation methods in those wireless lines. In addition, it is assumed that time-division multiplex transmission is performed with the wireless lines 5-7 being the current lines, and that the modulation methods in those wireless lines are 64-Quadrature Amplitude Modulation. It is assumed in this case that a failure occurs in the wireless line 6.

In step 701 in FIG. 7, the modulation/demodulation unit 1236 of the wireless communication apparatus 52 detects the occurrence of a failure in wireless line 6 from a received data signal. Then, the modulation/demodulation unit 1236 sends an alarm ALM that reports the occurrence of a failure in the wireless line 6 to the monitoring and controlling unit 1251 (arrow 601 in FIG. 6).

In step 702 in FIG. 7, upon receiving the alarm ALM, the monitoring and controlling unit 1251 makes a judgment that a relief preparation for the current line of the time-division multiplex transmission is needed. Then, the monitoring and controlling unit 1251 makes a request for the relief preparation for the current line of the time-division multiplex to the monitoring and controlling unit 1151 of the wireless communication apparatus 51 (arrow 602 in FIG. 6).

In step 703 in FIG. 7, upon receiving the relief preparation request for the current line, the monitoring and controlling unit 1151 of the wireless communication apparatus 51 checks for a system that corresponds to the modulation method used in the time-division multiplex transmission from the SYS1-4 in which Adaptive Coding and Modulation control is performed.

That is, the monitoring and controlling unit 1151 makes a request for information about the modulation method currently used for modulation, to the modulation/demodulation units 1131-1134 (arrow 603 in FIG. 6). According to the request, the modulation/demodulation units 1131-1134 transmit the information about the modulation method currently used for modulation to the monitoring and controlling unit 1151 (arrow 604 in FIG. 6). Upon receiving the information about the modulation method currently used for modulation, the monitoring and controlling unit 1151 of the wireless communication apparatus 51 checks for a system that corresponds to the modulation method used in the time-division multiplex transmission from the SYS1-4.

Meanwhile, the monitoring and controlling unit 1251 of the wireless communication apparatus 52 checks for a system that corresponds to the modulation method used in the time-division multiplex transmission from the SYS1-4 in which Adaptive Coding and Modulation is performed.

That is, the monitoring and controlling unit 1251 makes a request for information about the modulation method currently used for demodulation, to the modulation/demodulation units 1231-1234 (arrow 605 in FIG. 6). According to the request, the modulation/demodulation units 1231-1234 transmit the information about the modulation method currently used for demodulation to the monitoring and controlling unit 1251 (arrow 606 in FIG. 6). Upon receiving the information about the modulation method currently used for demodulation, the monitoring and controlling unit 1251 of the wireless communication apparatus 52 checks for a system that corresponds to the modulation method used in the time-division multiplex transmission, from the SYS1-4.

It is assumed that, as a result of the respective check in step 703 in FIG. 7, as illustrated in FIG. 6 for example, the modulation method currently used in the SYS3 corresponds to 64-Quradrature Amplitude Modulation being the modulation method used in the time-division multiplex transmission. In this case, the monitoring and controlling unit 1151 of the wireless communication apparatus 51 makes a judgment that the modulation method currently used in SYS3 for modulation corresponds to the modulation method used in the time-division multiplex transmission. In addition, the monitoring and controlling unit 1251 of the wireless communication apparatus 52 makes a judgment that the modulation method currently used in SYS3 for demodulation corresponds to the modulation method used in the time-division multiplex transmission. Then, advancement to step 704 in FIG. 7 is performed.

In step 704 in FIG. 7, based on the judgment that the modulation methods are matched, the monitoring and controlling unit 1151 of the wireless communication apparatus 51 makes a request to the aggregation unit 1101 for the degeneration operation of Link Aggregation for the SYS3 to release the wireless line 3 from the virtual line (arrow 607 in FIG. 6). The aggregation unit 1101 that received the request for the degeneration operation stops the assignment of the Ethernet frame to the SYS3 by the degeneration operation of Link Aggregation. Then, the aggregation unit 1101 reports the completion of the degeneration operation for the SYS3 to the monitoring and controlling unit 1151 (arrow 608 in FIG. 6). Information about the stop of the assignment of the Ethernet frame to the SYS3 is stored in the communication carrier condition management table 241 of the monitoring and controlling unit 1151.

Meanwhile, based on the judgment that the modulation methods are matched, the monitoring and controlling unit 1251 of the wireless communication apparatus 52 makes a request to the aggregation unit 1201 for the degeneration operation of Link Aggregation for the SYS3 to release the wireless line 3 from the virtual line (arrow 609 in FIG. 6). The aggregation unit 1201 that received the request for the degeneration operation stops the assignment of the Ethernet frame to the SYS3 by the degeneration operation of Link Aggregation. Then, the aggregation unit 1201 reports the completion of the degeneration operation for the SYS3 to the monitoring and controlling unit 1251 (arrow 610 in FIG. 6). Information about the stop of the assignment of the Ethernet frame to the SYS3 is stored in the communication carrier condition management table 241 of the monitoring and controlling unit 1251.

Upon receiving the report of the completion of the degeneration operation for the SYS3, the monitoring and controlling unit 1151 of the wireless communication apparatus 51 makes a judgment that the relief preparation for the current line of the time-division multiplex transmission has been completed. Then, the monitoring and controlling unit 1151 reports the completion of the relief preparation for the current line of the time-division multiplex transmission to the monitoring and controlling unit 1251 of the wireless communication apparatus 52 (arrow 611 in FIG. 6).

When the monitoring and controlling unit 1251 of the wireless communication apparatus 52 receives the report of the completion of the relief preparation for the current line of the time-division multiplex transmission, advancement to step 705 in FIG. 7 is performed. That is, the monitoring and controlling unit 1251 makes a judgment that the switch needs to be driven so as to switch the system at the transmitting end side between the SYS3 and the SYS6. Then, the monitoring and controlling unit 1251 of the wireless communication apparatus 52 makes a request to the monitoring and controlling unit 1151 of the wireless communication apparatus 51 for driving the switch to switch the system at the transmitting end side between the SYS3 and the SYS6 (arrow 612 in FIG. 6).

Upon receiving the driving request for the switch at the transmitting end side, the monitoring and controlling unit 1151 of the wireless communication apparatus 51 makes a request to the switching unit 5121 for driving the switch to perform the switching of the system at the transmitting end side between the SYS3 and SYS6 (arrow 613 in FIG. 6). The switching unit 5121 drives the switch so that the data signal processed by the baseband signal processing unit 1116 is modulated by the modulation/demodulation unit 1133 and transmitted by the transmission/reception unit 1143. Then, the switching unit 5121 reports the completion of the driving of the switch to perform the switching of the system at the transmitting end to the monitoring and controlling unit 1151 (arrow 614 in FIG. 6).

The monitoring and controlling unit 1151 that received the report makes a judgment that the driving of the switch to perform the switching of the system at the transmitting end side between the SYS3 and the SYS6 has been completed. Then, the monitoring and controlling unit 1151 reports the completion of the driving of the switch at the transmitting end side to the monitoring and controlling unit 1251 of the wireless communication apparatus 52 (arrow 615 in FIG. 6).

When the monitoring and controlling unit 1251 of the wireless communication apparatus 52 receives the report of the completion of the driving of the switch at the transmitting end side, advancement to step 706 in FIG. 7 is performed. That is, the monitoring and controlling unit 1251 makes a judgment that the switch to perform switching of the system at the receiving end side between the SYS3 and the SYS6 needs to be driven. Then, the monitoring and controlling unit 1251 makes a request to the switching unit 5221 for driving the switch at the receiving end side (arrow 616 in FIG. 6). The switching unit 5221 that received the request drives the switch so that when the data signal transmitted via the SYS3 of the wireless apparatus 51 is received by the transmission/reception unit 1243 and demodulated by the modulation/demodulation unit 1233, it is signal-processed by the baseband signal processing unit 1216. Then, the completion of the driving of the switch to switch the system at the receiving end side between the SYS3 and the SYS6 is reported to the monitoring and controlling unit 1251 (arrow 617 in FIG. 6). The series of switching operations for the SYS6 corresponding to the wireless line 6 in which a failure has occurred is completed (step 707 in FIG. 7).

On the other hand, it is assumed that, as a result of the check in step 703 in FIG. 7, there is no system in the SYS1-4 that corresponds to the modulation method used in the time-division multiplex transmission. In this case, the monitoring and controlling units 1151 and 1251 make a judgment that there is no system in the SYS1-4 that corresponds to the modulation method used in the time-division multiplex transmission, and advancement to step 708 is performed.

It may be said that a wireless line performing data transmission using a higher-order modulation method than the modulation method used in the time-division multiplex is a wireless line that is capable of securing a good line quality, even if it does not correspond to the modulation method used in the time-division multiplex transmission.

Therefore, in step 708 in FIG. 7, the monitoring and controlling unit 1151 of the wireless communication apparatus 51 checks for a system in which a modulation method currently used for modulation is higher-order than the modulation method used in the time-division multiplex transmission, from the SYS1-4. In addition, the monitoring and controlling unit 1251 of the wireless communication apparatus 52 checks for a system in which a modulation method currently used for demodulation is higher-order than the modulation method used in the time-division multiplex transmission, from the SYS1-4.

It is assumed that, as a result of the respective check by the monitoring and controlling units 1151 and 1251, the modulation method for the SYSn (SYSn represents one of the SYS1-4) is higher-order than the modulation method used for the time-division multiplex transmission. In this case, the monitoring and controlling unit 1151 of the wireless communication apparatus 51 makes a judgment that the modulation method used for the modulation in the SYSn is higher-order than the modulation method used in the time-division multiplex transmission. In addition, the monitoring and controlling unit 1251 of the wireless communication apparatus 52 makes a judgment that the modulation method used for the demodulation in the SYSn is higher-order than the modulation method used in the time-division multiplex transmission. Then, advancement to step 709 in FIG. 7 is performed.

In step 709 in FIG. 7, based on the judgment that the modulation method is higher-order, the monitoring and controlling unit 1151 of the wireless communication apparatus 51 makes a request to the aggregation unit 1101 for the degeneration operation of Link Aggregation for the SYSn to release the wireless line n corresponding to the SYSn from the virtual line. The aggregation unit 1101 that received the request for the degeneration operation stops the assignment of the Ethernet frame to the SYSn by the degeneration operation of Link Aggregation. Then, the aggregation unit 1101 reports the completion of the degeneration operation for the SYSn to the monitoring and controlling unit 1151. Information about the stop of the assignment of the Ethernet frame to the SYSn is stored in the communication carrier condition management table 241 of the monitoring and controlling unit 1151.

Meanwhile, based on the judgment that the modulation method is higher-order, the monitoring and controlling unit 1251 of the wireless communication apparatus 52 makes a request to the aggregation unit 1201 for the degeneration operation of Link Aggregation for the SYSn to release the wireless line n corresponding to the SYSn from the virtual line. The aggregation unit 1201 that received the request for the degeneration operation stops the assignment of the Ethernet frame to the SYSn by the degeneration operation of Link Aggregation. Then, the aggregation unit 1201 reports the completion of the degeneration operation for the SYSn to the monitoring and controlling unit 1251. Information about the stop of the assignment of the Ethernet frame to the SYSn is stored in the communication carrier condition management table 241 of the monitoring and controlling unit 1251.

When the degeneration operation for the SYSn is completed, advancement to step 710 in FIG. 7 is performed. That is, the monitoring and controlling unit 1151 of the wireless communication apparatus 51 makes a request to the modulation/demodulation unit of the SYSn for changing the modulation method used for modulation in the SYSn to 64-Quadrature Amplitude Modulation used for the time-division multiplex transmission. In addition, the monitoring and controlling unit 1251 of the wireless communication apparatus 52 makes a request to the modulation/demodulation unit of the SYSn for changing the modulation method used for demodulation for the SYSn to 64-Quadrature Amplitude Modulation used for the time-division multiplex transmission.

Upon receiving the change request for the modulation method from the monitoring and controlling unit 1151, the modulation/demodulation unit of the SYSn of the wireless communication apparatus 51 changes the modulation method for the SYSn to 64-Quadrature Amplitude Modulation. Then, the modulation/demodulation unit of the SYSn reports the completion of the modulation method change to the monitoring and controlling unit 1151.

Meanwhile, Upon receiving the change request for the modulation method from the monitoring and controlling unit 1251, the modulation/demodulation unit of the SYSn of the wireless communication apparatus 52 changes the modulation method for the SYSn to 64-Quadrature Amplitude Modulation. Then, the modulation/demodulation unit of the SYSn reports the completion of the modulation method change to the monitoring and controlling unit 1251.

Upon receiving the completion of the modulation method change for the SYSn, the monitoring and controlling unit 1151 of the wireless communication apparatus 51 makes a judgment that the relief preparation for the current line of the time-division multiplex transmission has been completed. Then, the monitoring and controlling unit 1151 reports the completion of the relief preparation for the current line of the time-division multiplex transmission to the monitoring and controlling unit 1251 of the wireless communication apparatus 52.

When the monitoring and controlling unit 1251 of the wireless communication apparatus 52 receives the report of the completion of the relief preparation for the current line of the time-division multiplex transmission, advancement to step 705 in FIG. 7 is performed. The flow from step 705 to step 707 in FIG. 7 are similar to the case advancing from step 704 to step 705 described above.

On the other hand, it is assumed that, as a result of the check in step 708 in FIG. 7, there is no system in the SYS1-4 in which the modulation method is higher-order than the modulation method used in the time-division multiplex transmission. In this case, the monitoring and controlling units 1151 and 1251 make a judgment there is no system in the SYS1-4 in which the modulation method is higher-order than the modulation method used in the time-division multiplex transmission, and advancement to step 711 is performed. That is, in this case, since no wireless line suitable for use as a backup line of the time-division multiple transmission exists, the switching of the line connection from the current line to a backup line of the time-division transmission in which a failure has occurred is not performed.

Meanwhile, when the switching of the line connection is not performed in step 711 in FIG. 7, the monitoring and controlling unit 1151 of the wireless communication apparatus 51 and the monitoring and controlling unit 1251 of the wireless communication apparatus 52 may check again after a prescribed time has elapsed whether or not any system corresponding to the modulation method used in the time-division multiplex transmission exists (step 703), and when none exists, whether or not any system of which modulation method is higher than the modulation method used in the time-division multiplex transmission exists (step 708).

According to the second embodiment of the present invention described above, when a failure occurs in the current line of the time-division multiplex transmission, from the respective wireless lines constituting the virtual transmission path of the Ethernet transmission a wireless line of which current modulation method corresponds to the modulation method used in the time-division multiplex transmission maybe used as a backup line of the time-division multiplex transmission.

Therefore, even though the operation to change the modulation method of the backup line to the modulation method used in the time-division multiplex transmission as instep 404 in FIG. 4 of the first embodiment is eliminated, a wireless line suitable for the backup line of the time-division multiplex transmission can be selected.

<Third Embodiment>

In the second embodiment described above, as seen in step 703 in FIG. 7, when a failure is detected in the current line of the time-division multiplex transmission and a backup line is selected, information about the current modulation method of the each wireless communication system in which the Ethernet transmission is performed is collected.

In contrast, in the third embodiment, information about the current modulation method of the each wireless communication system in which the Ethernet transmission is performed is collected in advance before selecting a backup line.

Figure 8:
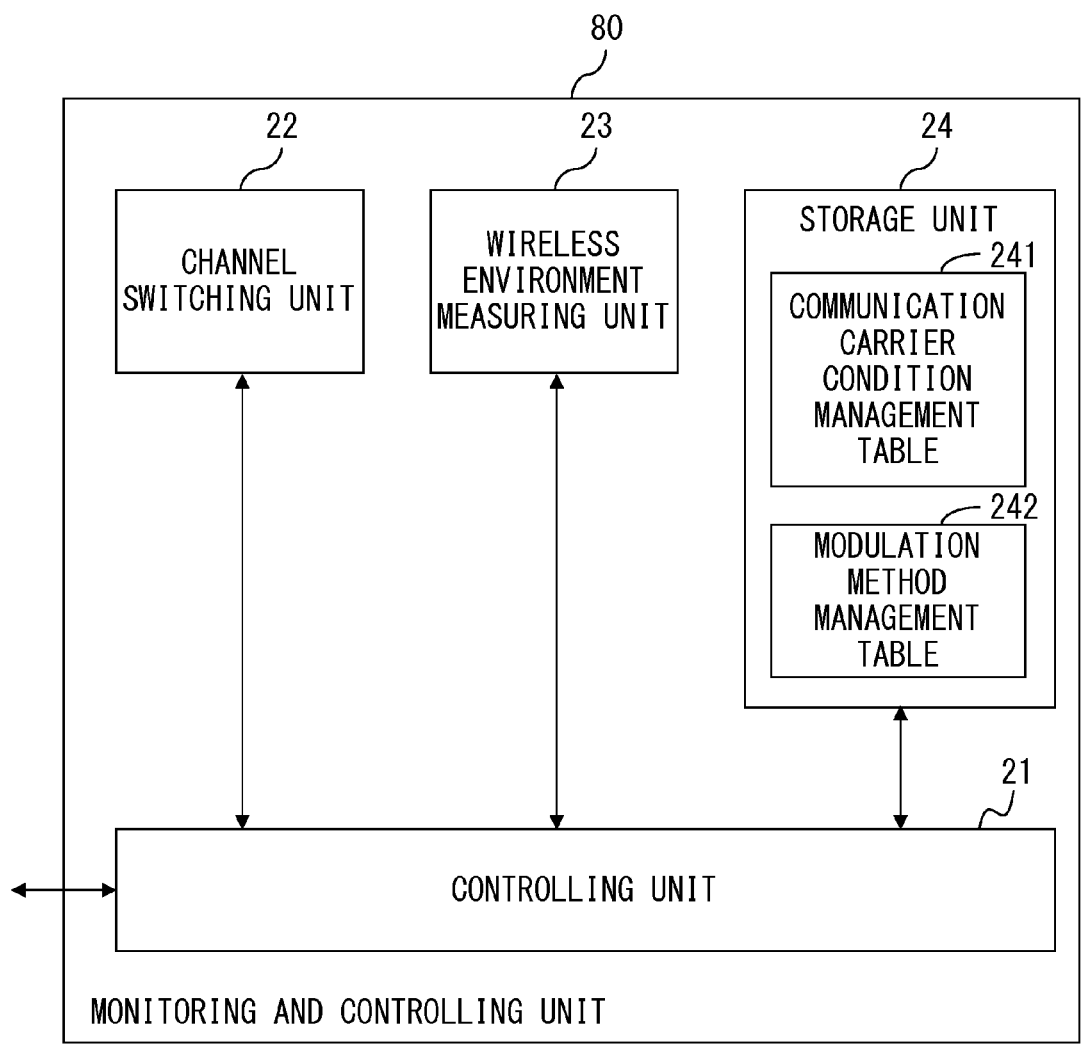
FIG. 8 is a diagram illustrating a configuration example of a monitoring and controlling unit of a wireless communication apparatus of the third embodiment.

As illustrated in the example diagram of a monitoring and controlling unit 80 in FIG. 8, in the third embodiment, in addition to the respective constituent elements illustrated in the example diagram of the monitoring and controlling unit 20 in FIG. 2, a modulation method management table 242 is provided in the storage unit 24 of the monitoring and controlling unit of the wireless communication apparatus. The modulation method management table 242 stores the modulation methods currently used in the respective wireless communication systems in which the Ethernet transmission is performed.

In the Ethernet transmission using Adaptive Modulation and Coding control, the modulation method used in the system corresponding to each line constituting the virtual line is changed according to the change in the condition of the transmission path of each line. Then, in the third embodiment, a setting is made so that, when the modulation method used in the system is changed, the modulation/demodulation unit that changed the modulation method reports information about the changed modulation method to the monitoring and controlling unit. Then, upon receiving the information, the monitoring and controlling unit stores the information about the changed modulation method in the modulation method management table 242.

The configuration example of the wireless communication system of the third embodiment other than the modulation method management table 242 described above presenting the example diagram of the monitoring and controlling unit 80 in FIG. 8 is similar to the wireless communication system of the second embodiment illustrated in FIG. 5.

Figure 9A:
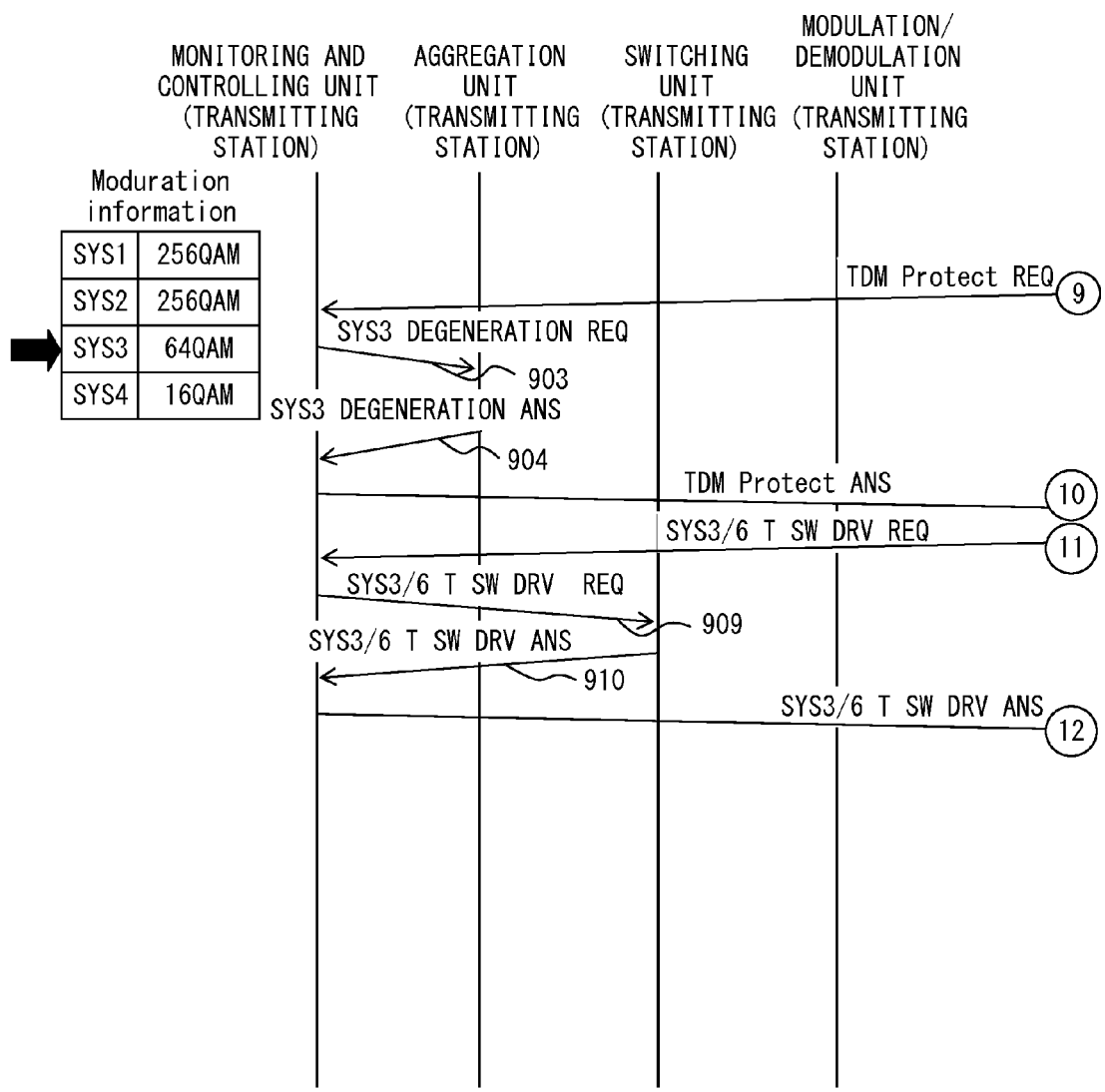
FIG. 9A is a redundancy switching sequence diagram of time-division multiplex transmission of the third embodiment.
Figure 9B:
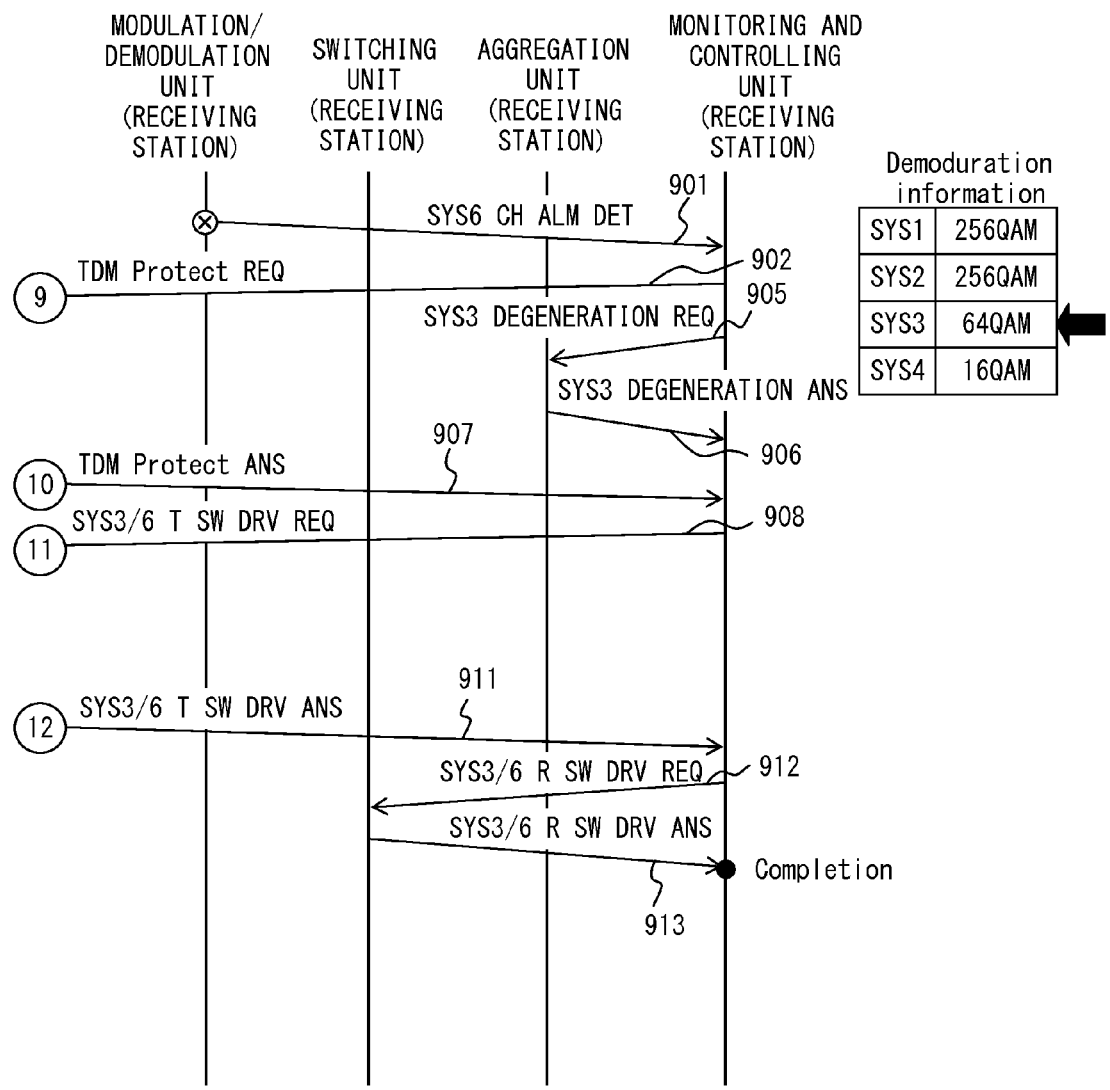
FIG. 9B is a redundancy switching sequence diagram of time-division multiplex transmission of the third embodiment.

In the configuration example of the wireless communication system of the third embodiment, a method to switch the line connection from the current line to a backup line when a failure occurs in the current line of the time-division multiplex transmission is explained using a redundancy switching sequence diagram of time-division multiplex transmission in FIG. 9 including FIGS. 9A and 9B and a redundancy switching flowchart of time-division multiplex transmission in FIG. 10.

In the configuration example of the wireless communication system of the third embodiment in FIG. 5, for example, the wireless communication apparatus 51 is assumed as a transmitting station, and the wireless communication apparatus 52 is assumed as a receiving station. Then, it is assumed that the virtual transmission path of the Ethernet transmission is established by the wireless lines 1-4, and that Adapting Coding and Modulation control is performed for the modulation methods in those wireless lines. In addition, it is assumed that time-division multiplex transmission is performed with the wireless lines 5-7 being the current lines, and that the modulation methods in those wireless lines are 64-Quadrature Amplitude Modulation. It is assumed in this case that a failure occurs in the wireless line 6.

Instep 1001 in FIG. 10, the modulation/demodulation unit 1236 of the wireless communication apparatus 52 detects the occurrence of a failure in wireless line 6 from a received data signal. Then, the modulation/demodulation unit 1236 transmits an alarm ALM that reports the occurrence of a failure in the wireless line 6 to the monitoring and controlling unit 1251 (arrow 901 in FIG. 9).

In step 1002 in FIG. 10, upon receiving the alarm ALM, the monitoring and controlling unit 1251 makes a judgment that a relief preparation for the current line of the time-division multiplex transmission is needed. Then, the monitoring and controlling unit 1251 makes a request for the relief preparation for the current line of the time-division multiplex to the monitoring and controlling unit 1151 of the wireless communication apparatus 51 (arrow 902 in FIG. 9).

In step 1003 in FIG. 10, upon receiving the relief preparation request for the current line, the monitoring and controlling unit 1151 of the wireless communication apparatus 51 checks for a system that corresponds to the modulation method used in the time-division multiplex transmission from the SYS1-4, using the modulation method management table 242. In addition, the monitoring and controlling unit 1251 of the wireless communication apparatus 52 checks for a system that corresponds to the modulation method used in the time-division multiplex transmission from the SYS1-4, using the modulation method management table 242.

Then, it is assumed that, as a result of the respective check in step 1003 in FIG. 10, as illustrated in FIG. 9 for example, the modulation method currently used in the SYS3 corresponds to 64-Quradrature Amplitude Modulation being the modulation method used in the time-division multiplex transmission. In this case, the monitoring and controlling unit 1151 of the wireless communication apparatus 51 makes a judgment that the modulation method currently used in SYS3 for modulation corresponds to the modulation method used in the time-division multiplex transmission. In addition, the monitoring and controlling unit 1251 of the wireless communication apparatus 52 makes a judgment that the modulation method currently used in SYS3 for demodulation corresponds to the modulation method used in the time-division multiplex transmission. Then, advancement to step 1004 in FIG. 10 is performed.

In step 1004 in FIG. 10, based on the judgment that the modulation methods are matched, the monitoring and controlling unit 1151 of the wireless communication apparatus 51 makes a request to the aggregation unit 1101 for the degeneration operation of Link Aggregation for the SYS3 to release the wireless line 3 from the virtual line (arrow 903 in FIG. 9). The aggregation unit 1101 that received the request for the degeneration operation stops the assignment of the Ethernet frame to the SYS3 by the degeneration operation of Link Aggregation. Then, the aggregation unit 1101 reports the completion of the degeneration operation for the SYS3 to the monitoring and controlling unit 1151 (arrow 904 in FIG. 9). Information about the stop of the assignment of the Ethernet frame to the SYS3 is stored in the communication carrier condition management table 241 of the monitoring and controlling unit 1151.

Meanwhile, based on the judgment that the modulation method are matched, the monitoring and controlling unit 1251 of the wireless communication apparatus 52 makes a request to the aggregation unit 1201 for the degeneration operation of Link Aggregation for the SYS3 to release the wireless line 3 from the virtual line (arrow 905 in FIG. 9). The aggregation unit 1201 that received the request for the degeneration operation stops the assignment of the Ethernet frame to the SYS3 by the degeneration operation of Link Aggregation. Then, the aggregation unit 1201 reports the completion of the degeneration operation for the SYS3 to the monitoring and controlling unit 1251 (arrow 906 in FIG. 9). Information about the stop of the assignment of the Ethernet frame to the SYS3 is stored in the communication carrier condition management table 241 of the monitoring and controlling unit 1251.

Upon receiving the report of the completion of the degeneration operation for the SYS3, the monitoring and controlling unit 1151 of the wireless communication apparatus 51 makes a judgment that the relief preparation for the current line of the time-division multiplex transmission has been completed. Then, the monitoring and controlling unit 1151 reports the completion of the relief preparation for the current line of the time-division multiplex transmission to the monitoring and controlling unit 1251 of the wireless communication apparatus 52 (arrow 907 in FIG. 9).

When the monitoring and controlling unit 1251 of the wireless communication apparatus 52 receives the report of the completion of the relief preparation for the current line of the time-division multiplex transmission, advancement to step 1005 in FIG. 10 is performed. That is, the monitoring and controlling unit 1251 makes a judgment that the switch needs to be driven so as to switch the system at the transmitting end side between the SYS3 and the SYS6. Then, the monitoring and controlling unit 1251 of the wireless communication apparatus 52 makes a request to the monitoring and controlling unit 1151 of the wireless communication apparatus 51 for driving the switch to switch the system at the transmitting end side between the SYS3 and the SYS6 (arrow 908 in FIG. 9).

Upon receiving the driving request for the switch at the transmitting end side, the monitoring and controlling unit 1151 of the wireless communication apparatus 51 makes a request to the switching unit 5121 for driving the switch to perform the switching of the system at the transmitting end side between the SYS3 and SYS6 (arrow 909 in FIG. 9). The switching unit 1121 drives the switch so that the data signal processed by the baseband signal processing unit 1116 is modulated by the modulation/demodulation unit 1133 and transmitted by the transmission/reception unit 1143. Then, the switching unit 5121 reports the completion of the driving of the switch to perform the switching of the system at the transmitting end side to the monitoring and controlling unit 1151 (arrow 910 in FIG. 9).

The monitoring and controlling unit 1151 that received the report makes a judgment that the driving of the switch to perform the switching of the system at the transmitting end side between the SYS3 and the SYS6 has been completed. Then, the monitoring and controlling unit 1151 reports the completion of the driving of the switch at the transmitting end side to the monitoring and controlling unit 1251 of the wireless communication apparatus 52 (arrow 911 in FIG. 9).

When the monitoring and controlling unit 1251 of the wireless communication apparatus 52 receives the report of the completion of the driving of the switch at the transmitting end side, advancement to step 1006 in FIG. 10 is performed. That is, the monitoring and controlling unit 1251 makes a judgment that the switch to perform switching of the system at the receiving end side between the SYS3 and the SYS6 needs to be driven. Then, the monitoring and controlling unit 1251 makes a request to the switching unit 5221 for driving the switch at the receiving end side (arrow 912 in FIG. 9). The switching unit 5221 that received the request drives the switch so that when the data signal transmitted via the SYS3 of the wireless apparatus 51 is received by the transmission/reception unit 1243 and demodulated by the modulation/demodulation unit 1233, it is signal-processed by the baseband signal processing unit 1216. Then, the completion of the driving of the switch to switch the system at the receiving end side between the SYS3 and the SYS6 is reported to the monitoring and controlling unit 1251 (arrow 913 in FIG. 9). The series of switching operations for the SYS6 corresponding to the wireless line 6 in which a failure has occurred is completed (step 1007 in FIG. 10).

Meanwhile, when there is no system in the SYS1-4 that corresponds to the modulation method used in the time-division multiplex transmission as a result of the check in step 1003 in FIG. 10, it is possible to perform switching with the system of the SYS6 by selecting a modulation method that is higher-order than the modulation method used in the time-division multiplex transmission. This is as described above about the second embodiment in relation to step 708 in FIG. 7.

According to the third embodiment of the present invention described above, when selecting the backup line of the time-division multiplex transmission, the modulation method of each system in which the Ethernet transmission is performed may be checked by referring to the management table in which the modulation method currently used in each system is recorded in advance.

Therefore, the time for collecting the modulation method currently used in each system that is performing the Ethernet transmission as in step 703 in FIG. 7 of the second embodiment is not required. For this reason, the relief time of the time-division multiplex transmission can be shortened, and a wireless line suitable for the backup line of the time-division multiplex transmission can be selected.

<Fourth Embodiment>

In the second and third embodiment described above, a wireless line of which current modulation method corresponds to the modulation method used in the time-division multiplex transmission or is higher-order than the modulation method used in the time-division multiplex transmission in the respective wireless lines constituting the virtual transmission path of Ethernet transmission is selected as a backup line of the time-division multiplex transmission.

In contrast, in the fourth embodiment, the line qualities of the respective wireless lines are ranked using the temporal transition of a parameter to characterize the line quality of the respective wireless lines constituting the virtual transmission path of the Ethernet transmission, and the line of which line quality is the most stable is selected as a backup line.

First, the first example using the line modulation method of the wireless line as the parameter to characterize the line quality is descried below.

FIG. 11 is a diagram illustrating the temporal transitions of the modulation methods of the SYS1-SYS4 corresponding to the wireless lines 1-4 that may constitute the virtual transmission line of the Ethernet transmission.

As illustrated in FIG. 11, in the modulation method of wireless line, for example, numerical conversion is performed with the 256-Quadrature Amplitude Modulation as 1, 64-Quadrature Amplitude Modulation as 2, 16-Quadrature Amplitude Modulation as 3, and 4-Quadrature Amplitude Modulation as 4. That is, since the a wireless line capable of performing transmission using a higher-order modulation method may be evaluated as a wireless line with a better line quality, in the example in FIG. 11, a smaller numerical value indicates a better line quality. Then, as illustrated in FIG. 11, the temporal transitions of the line qualities of the respective wireless lines are recorded from a certain time $t_{-n}$ in the past and to the current time t, and their average value avg are calculated.

In FIG. 11, referring to the line qualities of the wireless lines corresponding to the SYS1-SYS4 at the current time t, the line quality of the wireless line 3 corresponding to the SYS3 is the best. However, referring to the average values avgs of the temporal transitions of the line qualities of the wireless lines, the line quality of the wireless line 3 corresponding to the SYS3 is the worst. For this reason, the line quality of the wireless line 3 is predicted to deteriorate afterward. Therefore, it is judged that the wireless line 3 is not a wireless line having a stable line quality required for the time-division multiplex transmission.

Meanwhile, in FIG. 11, the line qualities of the wireless lines corresponding to the SYS1, SYS2 and SYS4 other than the SYS3 at the current time t are the same. However, referring to the average values avgs of the temporal transitions of the line qualities of the wireless lines corresponding to the SYS1, SYS2 and SYS4, the wireless line 1 corresponding to the SYS1 is the best. Therefore, it is judged that the wireless line that is capable of obtaining a stable line quality required for the time-division multiplex transmission.

As described above, by ranking the line qualities of the wireless lines using the temporal transitions of the modulation methods, an optimal wireless line as the backup line for the time-division multiplex transmission can be selected from the respective wireless lines constituting the virtual transmission path of the Ethernet transmission.

In the first example described above, as a parameter to characterize the line quality, the modulation method of the wireless line is used. However, the parameter to characterize the line quality is not limited to the modulation method of the wireless line. Therefore, by ranking the line qualities while selecting the parameter according to the factor of the occurrence of propagation loss, a more optimal backup line of the time-division multiplex transmission may be selected.

In the second example presented below, in addition to the modulation method of the wireless line, the reception input level is used as a parameter to characterize the line quality.

For example, in an rainy region, attenuation due to precipitation often occurs. Since the attenuation due to precipitation has a characteristic that moderate variation occurs continuously, the spectrum becomes a waveform with the overall level lowered as illustrated in FIG. 12. Therefore, in a region where attenuation due to precipitation often occurs, the use of the reception input level as a parameter to characterize the line quality is effective.

FIG. 13 is a diagram illustrating the temporal transitions of the reception input levels RSLs of the SYS1-SYS4 corresponding to the respective wireless lines 1-4 that may constitute the virtual transmission path of the Ethernet transmission. Meanwhile, FIG. 14 is a diagram illustrating the temporal transitions of the modulation methods of the SYS1-SYS4.

In FIG. 13, a wireless line with a higher reception input level is evaluated as a wireless line with a better line quality, and a higher line quality rank (RSL rank) is assigned to a wireless line with a higher average value avg of the temporal transition of the reception input level. Meanwhile, in FIG. 14, in a similar manner to FIG. 11, a wireless line capable of performing transmission using a higher-order modulation method is evaluated as a wireless line with a better line quality and numerical conversion is performed, and a higher line quality rank (QAM rank) is assigned to a wireless line with a smaller average value of the temporal transition of the numerically-converted modulation method of the wireless line.

Referring to FIG. 14, the line quality ranks (QAM ranks) of the SYS1 and the SYS3 are both the first. For this reason, when only the modulation method of the wireless line is used as a parameter to characterize the line quality, the wireless lines 1 and 3 respectively corresponding to the SYS1 and the SYS3 are both treated as wireless lines having the same line quality.

However, referring to FIG. 13, the line quality rank (RSL) rank of the SYS1 is the first, and the line quality rank of the SYS4 is the second. Therefore, by using the reception input level in addition to the modulation method of the wireless line as a parameter to characterize the line quality, the wireless line 1 may be selected as a backup line of the time-division multiplex transmission that is more optimal adjusted to the factor of the occurrence of propagation loss such as attenuation due to precipitation.

In the third example below, the Carrier to Noise ratio (C/N ratio) is used in addition to the modulation method of the wireless line as a parameter to characterize the line quality.

For example, in a region where there is a large temperature difference in a day, attenuation due to the change in the atmospheric density and interference due to the variation in the reflection angle often occur. Since these attenuation due to the duct and fading due to interference have a characteristic that a steep change occurs instantly, the spectrum becomes a waveform that looks like a notch in its center as illustrated in FIG. 15. As a result, while the reception input level is not affected significantly, a code error occurs such as that the judgment of the 0/1 level is not performed correctly. Therefore, in a region where attenuation due to the duct and fading due to interference often occurs, the use of the Carrier to Noise ratio as a parameter to characterize the line quality is effective.

FIG. 16 is a diagram illustrating the temporal transitions of the Carrier to Noise ratios of the SYS1-SYS4 corresponding to the respective wireless lines 1-4 that may constitute the virtual transmission path of the Ethernet transmission. Meanwhile, FIG. 17 is a diagram illustrating the temporal transitions of the modulation methods of the wireless lines for the SYS1-SYS4.

In FIG. 16, a wireless line with a higher Carrier to Noise ratio is evaluated as a wireless line with a better line quality, and a higher line quality rank (C/N rank) is assigned to a wireless line with a higher average value avg of the temporal transition of the Carrier to Noise ratio. Meanwhile, in FIG. 17, in a similar manner to FIG. 11 and FIG. 14, a wireless line capable of performing transmission using a higher-order modulation method is evaluated as a wireless line with a better line quality and numerical conversion is performed, and a higher line quality rank (QAM rank) is assigned to a wireless line with a smaller average value of the temporal transition of the numerically-converted modulation method of the wireless line.

Referring to FIG. 17, the line quality ranks (QAM ranks) of the SYS2 and the SYS3 are both the first. For this reason, when only the modulation method of the wireless line is used as a parameter to characterize the line quality, the wireless lines 2 and 3 respectively corresponding to the SYS2 and the SYS3 are both treated as wireless lines having the same line quality.

However, referring to FIG. 16, the line quality rank (C/N rank) of the SYS2 is the third, and the line quality rank (C/N rank) of the SYS3 is the first. Therefore, by using the Carrier to Noise ratio in addition to the modulation method of the wireless line as a parameter to characterize the line quality, the wireless line 3 may be selected as a backup line of the time-division multiplex transmission that is more optimal adjusted to the factor of the occurrence of propagation loss such as attenuation due to the duct and fading due to interference.

Figure 18:
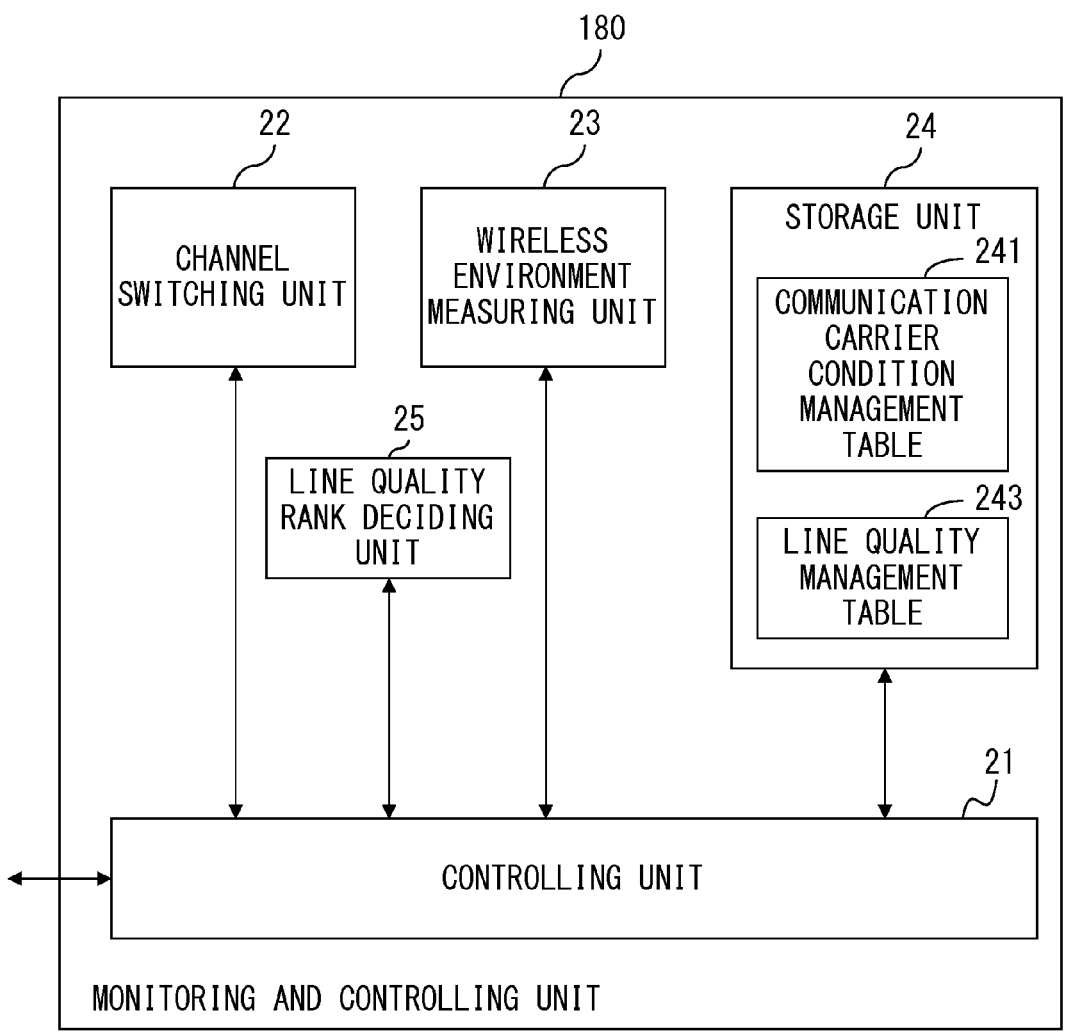
FIG. 18 is a diagram illustrating a configuration example of a monitoring and controlling unit of a wireless communication apparatus of the fourth embodiment.

To implement an example as described above, in the fourth embodiment, in addition to the respective constituent elements illustrated in the example diagram of the monitoring and controlling unit 20 in FIG. 2, the controlling and monitoring unit of the wireless communication apparatus includes a line quality rank deciding unit 25 as illustrated in the example diagram of a monitoring and controlling unit 180 in FIG. 18. The line quality rank deciding unit 25 is a unit that decides the line quality rank of a wireless line corresponding to each system that performs the Ethernet transmission, and is a Digital Signal Processor (DSP) for example.

In addition, as illustrated in the example diagram of the monitoring and controlling unit 180 in FIG. 18, in the fourth embodiment, a line quality rank management table 243 that stores the line quality rank decided by the line quality rank deciding unit 25 is provided in the storage unit 24 of the monitoring and controlling unit of the wireless communication apparatus.

The configuration example of the wireless communication system of the fourth embodiment other than the monitoring and controlling unit 180 described above presenting FIG. 18 is similar to the wireless communication system of the second and third embodiments illustrated in FIG. 5.

In the fourth embodiment, the line quality ranks of the wireless lines 1-4 corresponding to the SYS1-SYS4 performing the Ethernet transmission are stored in the line quality rank management table 243 of the monitoring and controlling unit of the wireless communication apparatus by a method as explained below.

In the configuration example of the wireless communication system of the fourth embodiment in FIG. 5, for example, the wireless communication apparatus 51 is assumed as a transmitting station, and the wireless communication apparatus 52 is assumed as a receiving station. Then, it is assumed that the virtual transmission path of the Ethernet transmission is established by the wireless lines 1-4, and that Adapting Coding and Modulation control is performed for the modulation method in those wireless lines.

The monitoring and controlling unit 1251 of the wireless communication apparatus 52 receives the reception signals that the transmission/reception units 1241-1244 receive from the transmission/reception units 1141-1144 of the wireless communication apparatus 51 through the wireless lines 1-4 at each prescribed time. Then, the monitoring and controlling unit 1251 measures the received signals received from the transmission/reception units 1241-1244 about a prescribed parameter to characterize the line quality.

The monitoring and controlling unit 1251 decides the line quality ranks of the wireless lines 1-4 using the measurement results. Then, the monitoring and controlling unit 1251 stores the decided line quality ranks of the wireless lines 1-4 in the line quality rank management table 243.

In addition, the monitoring and controlling unit 1251 of the wireless communication apparatus 52 reports the decided line quality ranks of the wireless lines 1-4 to the monitoring and controlling unit 1151 of the wireless communication apparatus 51. Then, the monitoring and controlling unit 1151 stores the received line quality ranks of the wireless lines 1-4 in the line quality rank management table 243.

An example of the line quality rank management table 243 is illustrated in FIG. 19 and FIG. 20. FIG. 19 is a line quality rank management table of the second example described above, and FIG. 20 is a line quality rank management table of the third example described above. As illustrated in FIG. 19 and FIG. 20, by deciding the total line quality rank (total rank) using another parameter in addition to the modulation method of the line as a parameter to characterize the line quality, it becomes possible to rank the line quality in relation to the stable line quality with more certainty.

Figure 21A:
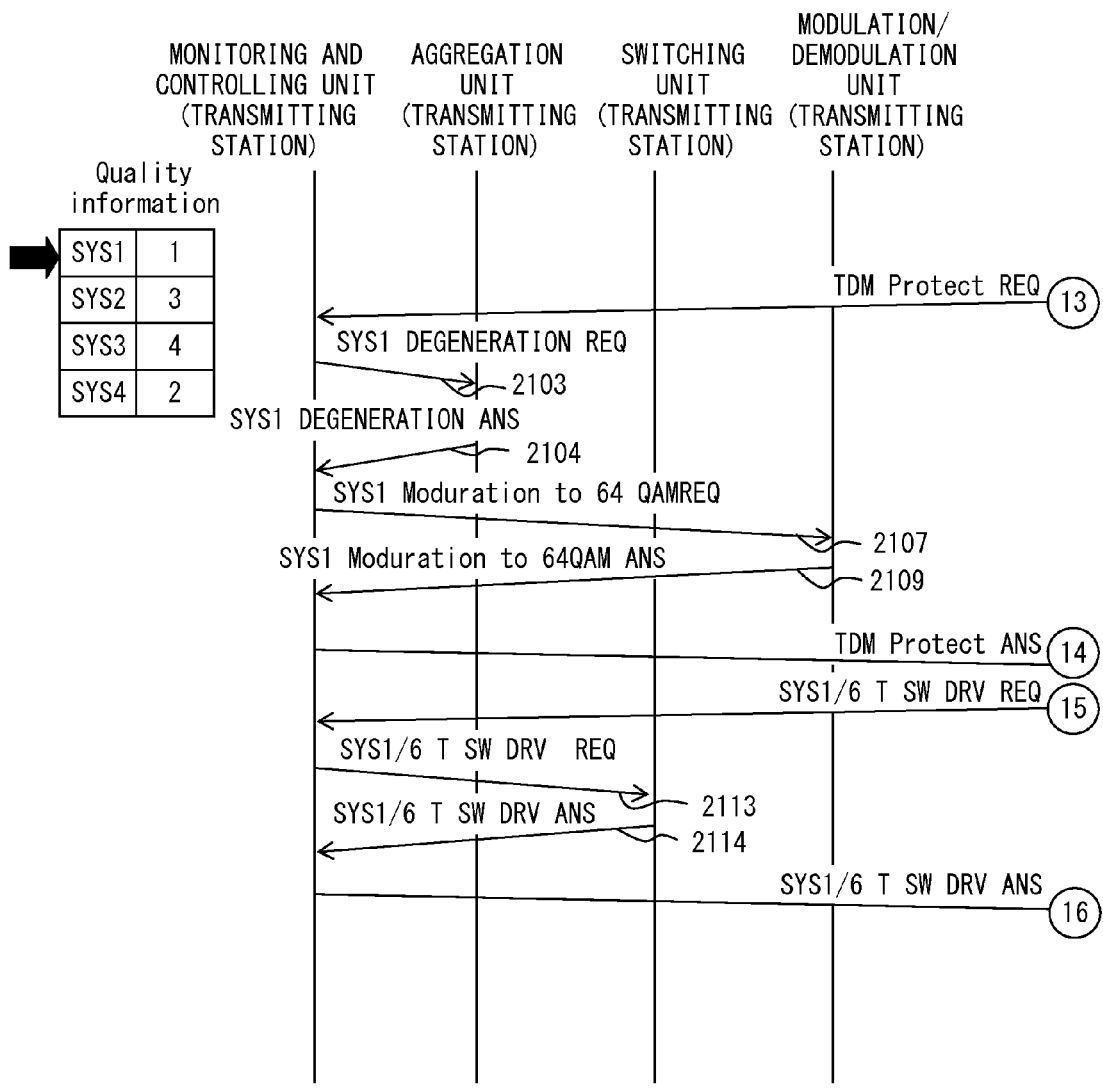
FIG. 21A is a redundancy switching sequence diagram of time-division multiplex transmission of the fourth embodiment.
Figure 21B:
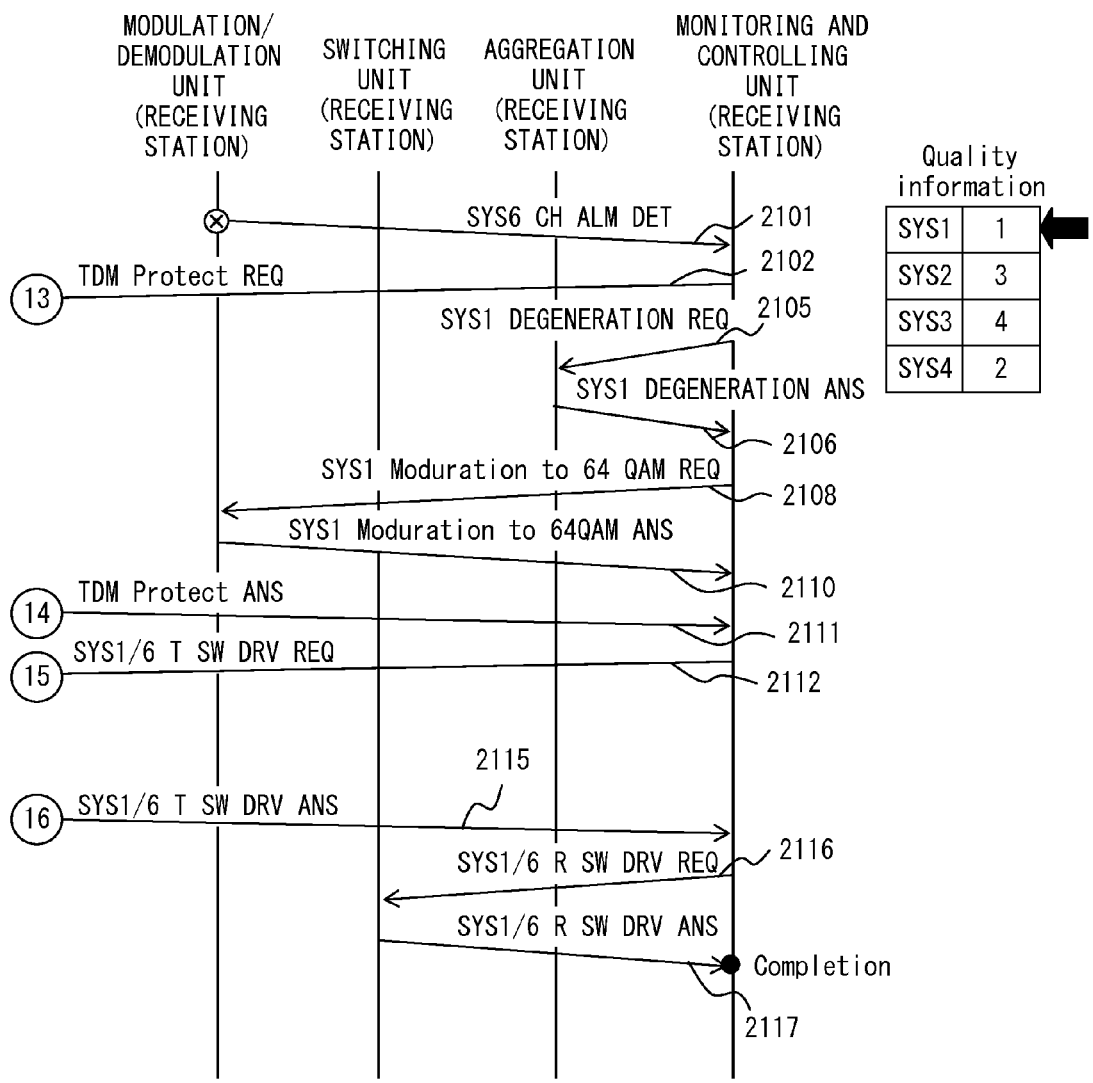
FIG. 21B is a redundancy switching sequence diagram of time-division multiplex transmission of the fourth embodiment.
Figure 22:
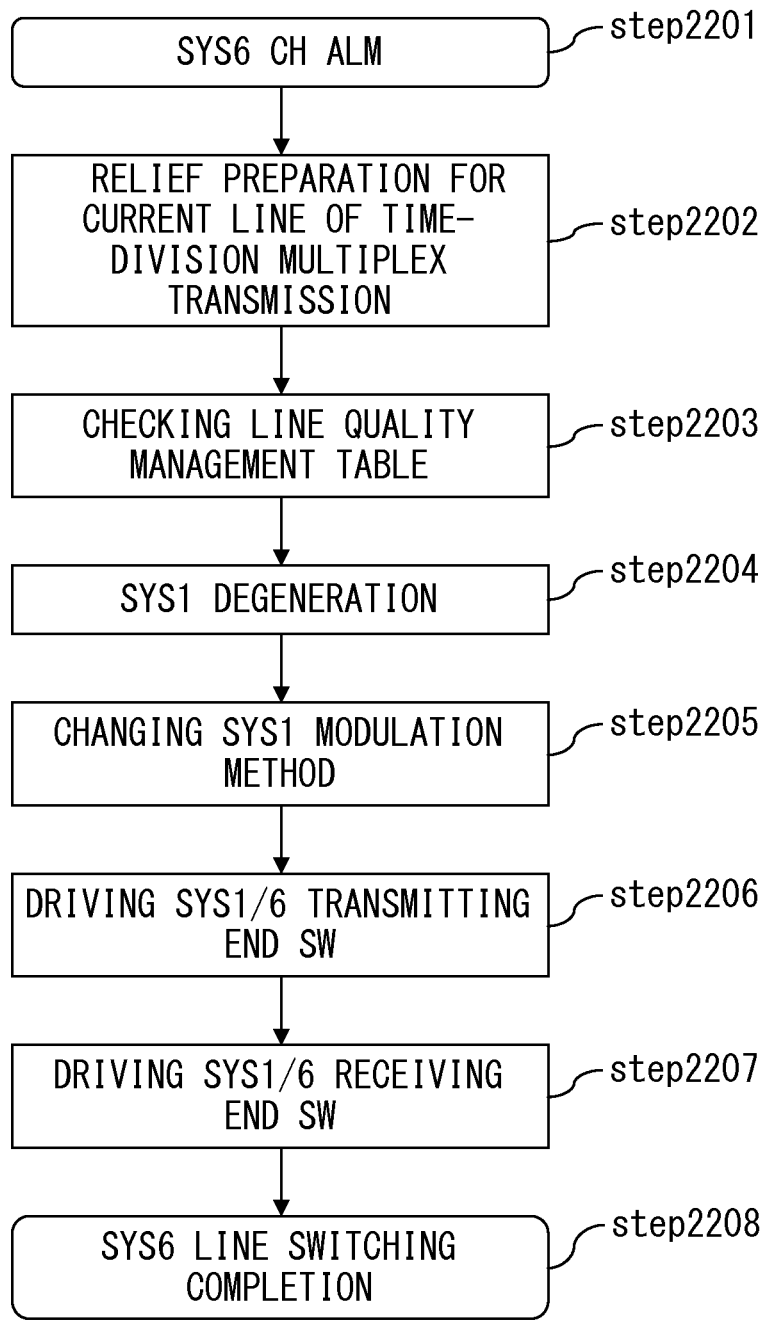
FIG. 22 is a redundancy switching flowchart of time-division multiplex transmission of the fourth embodiment.

In the configuration example of the wireless communication system of the fourth embodiment, a method to switch the line connection from the current line to a backup line when a failure occurs in the current line of the time-division multiplex transmission is explained using a redundancy switching sequence diagram of time-division multiplex transmission in FIG. 21 including FIGS. 21A and 21B and a redundancy switching flowchart of time-division multiplex transmission in FIG. 22.

In the configuration example of the wireless communication system of the fourth embodiment in FIG. 5, for example, the wireless communication apparatus 51 is assumed as a transmitting station, and the wireless communication apparatus 52 is assumed as a receiving station. Then, it is assumed that the virtual transmission path of the Ethernet transmission is established by the wireless lines 1-4, and that Adapting Coding and Modulation control is performed for the modulation methods in those wireless lines. In addition, it is assumed that time-division multiplex transmission is performed with the wireless lines 5-7 being the current lines, and that the modulation methods in those wireless lines are 64-Quadrature Amplitude Modulation. It is assumed in this case that a failure occurs in the wireless line 6.

Instep 2201 in FIG. 22, the modulation/demodulation unit 1236 of the wireless communication apparatus 52 detects the occurrence of a failure in wireless line 6 from a received data signal. Then, the modulation/demodulation unit 1236 transmits an alarm ALM that reports the occurrence of a failure in the wireless line 6 to the monitoring and controlling unit 1251 (arrow 2101 in FIG. 21).

Instep 2202 in FIG. 22, upon receiving the alarm ALM, the monitoring and controlling unit 1251 makes a judgment that a relief preparation for the current line of the time-division multiplex transmission is needed. Then, the monitoring and controlling unit 1251 makes a request for the relief preparation for the current line of the time-division multiplex to the monitoring and controlling unit 1151 of the wireless communication apparatus 51 (arrow 2102 in FIG. 21).

In step 2203 in FIG. 22, upon receiving the relief preparation request for the current line, the monitoring and controlling unit 1151 of the wireless communication apparatus 51 checks for a wireless line of which line quality rank is the first from among the wireless lines 1-4, using the line quality rank management table 243. Meanwhile, the monitoring and controlling unit 1251 of the wireless communication apparatus 52 checks for a wireless line of which line quality rank is the first from among the wireless lines 1-4, using the line quality rank management table 243

It is assumed that, as a result of the check in step 2203 in FIG. 22, the line quality rank of the wireless line 1 corresponding to the SYS1 is the first as illustrated in FIG. 21 for example. In this case, the monitoring and controlling unit 1151 of the wireless communication apparatus 51 makes a judgment that the line quality rank of the wireless line 1 is the first. Meanwhile, the monitoring and controlling unit 1251 of the wireless communication apparatus 52 makes a judgment that the line quality rank of the wireless line 1 is the first.

When the monitoring and controlling unit 1151 of the wireless communication apparatus 51 and the monitoring and controlling unit 1251 of the wireless communication apparatus 52 respectively make a judgment that the line quality rank of the wireless line 1 is the first, advancement to step 2204 in FIG. 22 is performed.

That is, the monitoring and controlling unit 1151 of the wireless communication apparatus 51 makes a request to the aggregation unit 1101 for the degeneration operation of Link Aggregation for the SYS1 to release the wireless line 1 from the virtual line (arrow 2103 in FIG. 21). The aggregation unit 1101 that received the request for the degeneration operation stops the assignment of the Ethernet frame to the SYS1 by the degeneration operation of Link Aggregation. Then, the aggregation unit 1101 reports the completion of the degeneration operation for the SYS1 to the monitoring and controlling unit 1151 (arrow 2104 in FIG. 21). Information about the stop of the assignment of the Ethernet frame to the SYS1 is stored in the communication carrier condition management table 241 of the monitoring and controlling unit 1151.

Meanwhile, the monitoring and controlling unit 1251 of the wireless communication apparatus 52 makes a request to the aggregation unit 1201 for the degeneration operation of Link Aggregation for the SYS1 to release the wireless line 1 from the virtual line (arrow 2105 in FIG. 21). The aggregation unit 1201 that received the request for the degeneration operation stops the assignment of the Ethernet frame to the SYS1 by the degeneration operation of Link Aggregation. Then, the aggregation unit 1201 reports the completion of the degeneration operation for the SYS1 to the monitoring and controlling unit 1251 (arrow 2106 in FIG. 21). Information about the stop of the assignment of the Ethernet frame to the SYS1 is stored in the communication carrier condition management table 241 of the monitoring and controlling unit 1251.

When the degeneration operation for the SYS1 is completed, advancement to step 2205 in FIG. 22 is performed. That is, the monitoring and controlling unit 1151 of the wireless communication apparatus 51 makes a request to the modulation/demodulation unit 1131 for changing the modulation method used for modulation in the SYS1 to 64-Quadrature Amplitude Modulation used for the time-division multiplex transmission (arrow 2107 in FIG. 21). In addition, the monitoring and controlling unit 1251 of the wireless communication apparatus 52 makes a request to the modulation/demodulation unit 1231 for changing the modulation method used for demodulation for the SYS1 to 64-Quadrature Amplitude Modulation used for the time-division multiplex transmission (arrow 2108 in FIG. 21).

Upon receiving the change request for the modulation method from the monitoring and controlling unit 1151, the modulation/demodulation unit 1131 of the wireless communication apparatus 51 changes the modulation method to 64-Quadrature Amplitude Modulation. Then, the modulation/demodulation unit 1131 reports the completion of the modulation method change to the monitoring and controlling unit 1151 (arrow 2109 in FIG. 21).

Meanwhile, upon receiving the change request for the modulation method from the monitoring and controlling unit 1251, the modulation/demodulation unit 1231 of the wireless communication apparatus 52 changes the modulation method to 64-Quadrature Amplitude Modulation. Then, the modulation/demodulation unit 1231 reports the completion of the modulation method change to the monitoring and controlling unit 1251 (arrow 2110 in FIG. 21).

Upon receiving the completion of the modulation method change for the modulation method used for modulation in the SYS1, the monitoring and controlling unit 1151 of the wireless communication apparatus 51 makes a judgment that the relief preparation for the current line of the time-division multiplex transmission has been completed. Then, the monitoring and controlling unit 1151 reports the completion of the relief preparation for the current line of the time-division multiplex transmission to the monitoring and controlling unit 1251 of the wireless communication apparatus 52 (arrow 2111 in FIG. 21).

When the monitoring and controlling unit 1251 of the wireless communication apparatus 52 receives the report of the completion of the relief preparation for the current line of the time-division multiplex transmission, advancement to step 2206 in FIG. 22 is performed. That is, the monitoring and controlling unit 1251 makes a judgment that the switch needs to be driven so as to switch the system at the transmitting end side between the SYS1 and the SYS6. Then, the monitoring and controlling unit 1251 makes a request to the monitoring and controlling unit 1151 of the wireless communication apparatus 51 for driving the switch to switch the system at the transmitting end side between the SYS1 and the SYS6 (arrow 2112 in FIG. 21).

Upon receiving the driving request for the switch at the transmitting end side, the monitoring and controlling unit 1151 of the wireless communication apparatus 51 makes a request to the switching unit 5121 for driving the switch to perform the switching of the system at the transmitting end side between the SYS1 and SYS6 (arrow 2113 in FIG. 21). The switching unit 5121 drives the switch to perform the switching of the system at the transmitting end side between the SYS1 and the SYS6 so that the data signal processed by the baseband signal processing unit 1116 is modulated by the modulation/demodulation unit 1131 and transmitted by the transmission/reception unit 1141. Then, the switching unit 5121 reports the completion of the driving of the switch to perform the switching of the system at the transmitting end side between the SYS1 and the SYS6 to the monitoring and controlling unit 1151 (arrow 2114 in FIG. 21).

Upon receiving the report of the completion of the driving of the switch at the transmitting end side, the monitoring and controlling unit 1151 makes a judgment that the driving of the switch to perform the switching of the system at the transmitting end side between the SYS1 and the SYS6 has been completed. Then, the monitoring and controlling unit 1151 reports the completion of the driving of the switch at the transmitting end side to the monitoring and controlling unit 1251 of the wireless communication apparatus 52 (arrow 2115 in FIG. 21).

When the monitoring and controlling unit 1251 of the wireless communication apparatus 52 receives the report of the completion of the driving of the switch at the transmitting end side, advancement to step 2207 in FIG. 22 is performed. That is, the monitoring and controlling unit 1251 makes a judgment that the switch needs to be driven so as to switch the system at the receiving end side between the SYS1 and the SYS6. Then, the monitoring and controlling unit 1251 makes a request to the switching unit 5221 for driving the switch at the receiving end side (arrow 2116 in FIG. 21). The switching unit 5221 that received the request drives the switch so that when the data signal transmitted via the SYS1 of the wireless apparatus 51 is received by the transmission/reception unit 1241 and demodulated by the modulation/demodulation unit 1231, it is signal-processed by the baseband signal processing unit 1216. Then, the completion of the driving of the switch to switch the system at the receiving end side between the SYS1 and the SYS6 is reported to the monitoring and controlling unit 1251 (arrow 2117 in FIG. 21). The series of switching operations for the SYS6 corresponding to the wireless line 6 in which a failure has occurred is completed as described above (step 2208 in FIG. 22).

As described above, in the fourth embodiment, ranking the line quality based on the temporal transition of the parameter that characterizes the line quality of each wireless line constituting the virtual transmission path of the Ethernet transmission is performed, and a wireless line having a stable line quality is selected as a backup line of the time-division multiplex transmission.

Therefore, according to the fourth embodiment, from the wireless lines constituting the virtual transmission path of the Ethernet transmission, a wireless line having a stable line quality can be selected as the backup line of the time-division multiplex transmission with more certainty.

<Fifth Embodiment>

In the fourth embodiment described above, after the detection of the occurrence of a failure in the current line of the time-division multiplex transmission, a line having a stable line quality is selected as the backup line from the wireless lines constituting the virtual transmission path of the Ethernet transmission in consideration of the temporal transition of the line quality.

In contrast, in the fifth embodiment, after the line connection switching from the current line of the time-division multiplex transmission to the backup line, when a change occurs in the line quality rank of the backup line, a wireless line having a higher line quality rank than the quality rank of the backup line is selected as a new backup line for the current line.

The configuration example of the wireless communication system of the fifth embodiment is similar to the wireless communication system of the fourth embodiment described above presenting FIG. 5 and FIG. 18.

As described in the fourth embodiment, when the wireless communication apparatus 51 is assumed as a transmitting station and the wireless communication apparatus 52 is assumed as a receiving station, the monitoring and controlling unit 1251 of the wireless communication apparatus 52 decides the line quality rank of each wireless line. Then, the monitoring and controlling unit 1251 stores the decided line quality rank of each wireless line in the line quality rank management table 243. In the fifth embodiment, when storing the line quality rank in the line quality rank management table 243, the monitoring and controlling unit 1251 of the wireless communication apparatus 52 judges whether or not a change has occurred in the line quality rank of the wireless line to which the line connection has been switched as the backup line.

Figure 23A:
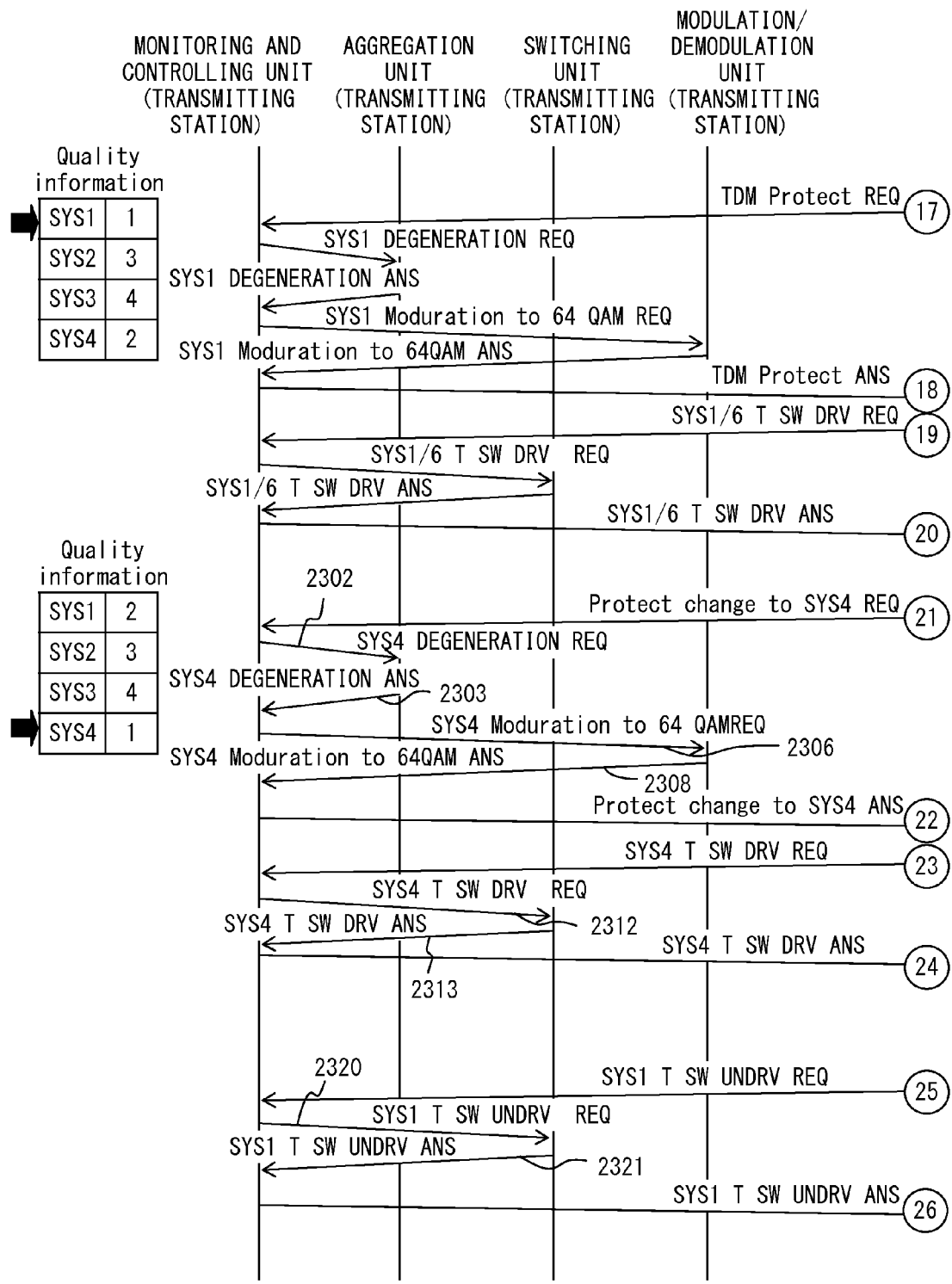
FIG. 23A is a shift sequence diagram of a backup line of the fifth embodiment.
Figure 23B:
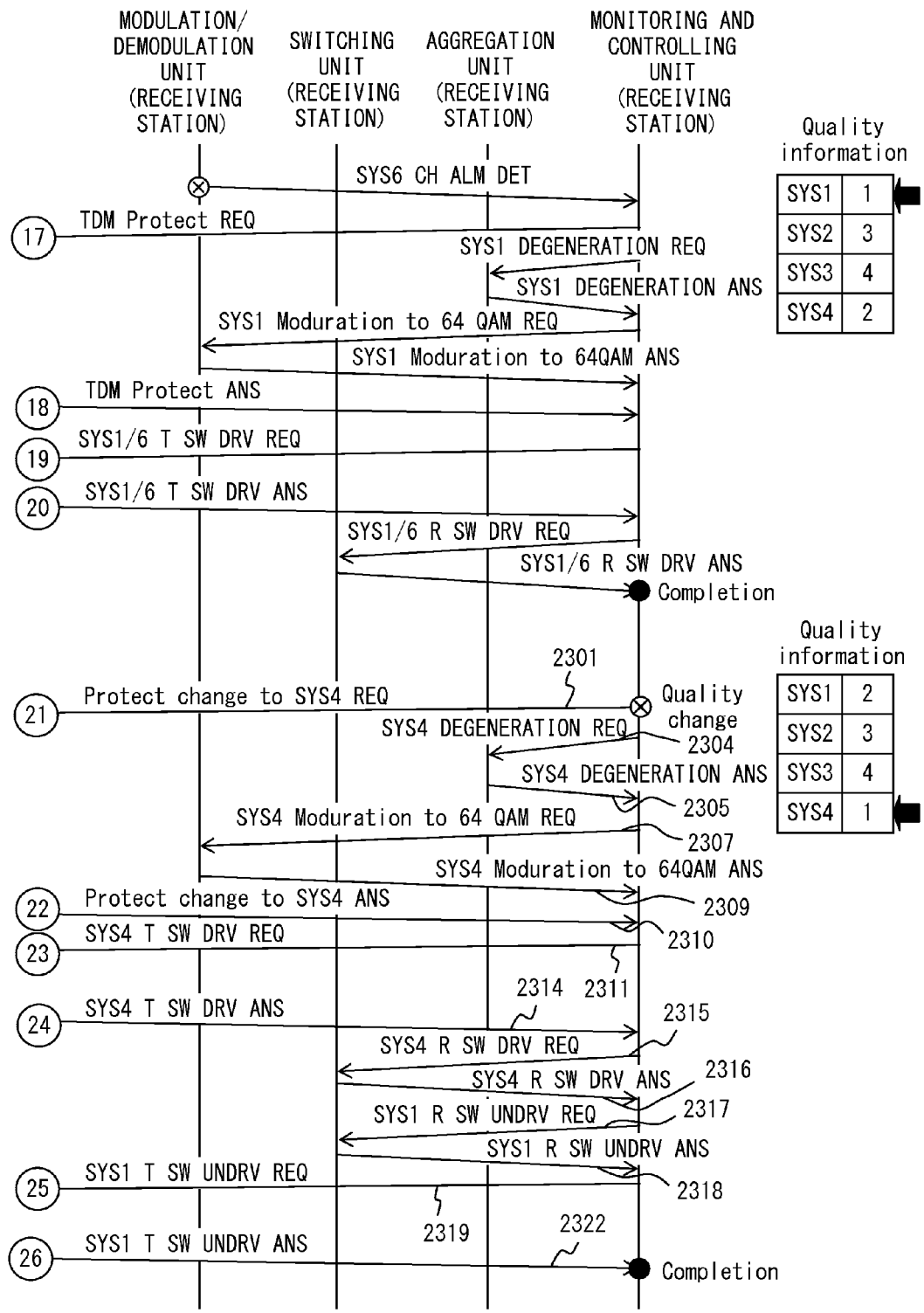
FIG. 23B is a shift sequence diagram of a backup line of the fifth embodiment.

In the wireless communication system of the fifth embodiment, a method to, when a change occurs in the line quality rank of the backup line after the line connection switching from the current line of the time-division multiplex transmission to the backup line, shift to a wireless line having a higher line quality rank than the quality rank of the backup line is explained below. For the explanation, a backup line shift sequence diagram of the time-division multiplex transmission in FIG. 23 including FIGS. 23A and 23B and a backup line shift flowchart of the time-division multiplex transmission in FIG. 24 are used.

In the configuration example of the wireless communication system of the fifth embodiment in FIG. 5, for example, the wireless communication apparatus 51 is assumed as a transmitting station, and the wireless communication apparatus 52 is assumed as a receiving station. Then, it is assumed that the virtual transmission path of the Ethernet transmission is established by the wireless lines 1-4, and that Adapting Coding and Modulation control is performed for the modulation methods in those wireless lines. In addition, it is assumed that time-division multiplex transmission is performed with the wireless lines 5-7 being the current lines, and that the modulation methods in those wireless lines are 64-Quadrature Amplitude Modulation. Then, it is assumed that a failure has occurred in the wireless line 6, and the line connection has been switched from the wireless line 6 being the current line to the wireless line 1 being the backup line by the line connection switching method described above in the fourth embodiment.

Figure 24:
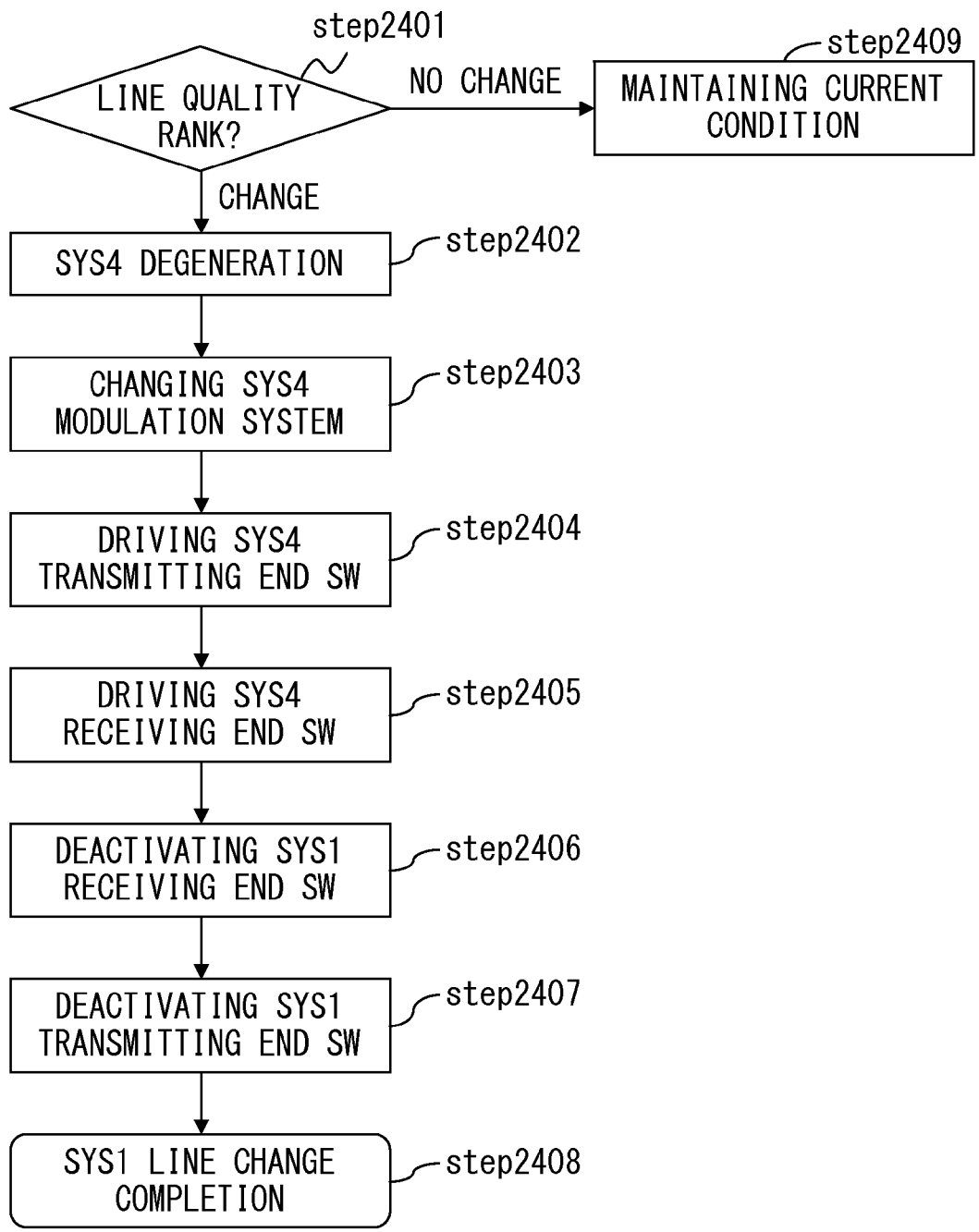
FIG. 24 is a shift flowchart of a backup line of the fifth embodiment.

In step 2401 in FIG. 24, when storing the line quality rank of each wireless line in the line quality rank management table 243, the monitoring and controlling unit 1251 of the wireless communication apparatus 52 judges whether or not any change has occurred in the line quality rank of the wireless line 1 to which the line connection has been switched from the wireless line 6 in which a failure has occurred. Then, it is assumed that, as illustrated in FIG. 23 for example, the line quality rank of the wireless line 1 corresponding to the SYS1 has changed from the first to the second, and the wireless line of which line quality rank is the first has changed to the wireless line 4 corresponding to the SYS4. When a change occurs in the line quality rank of the wireless line 1 as described above, the monitoring and controlling unit 1251 makes a judgment that the wireless line being the first in the line quality rank has changed from the wireless line 1 to the wireless line 4, and advancement to step 2402 in FIG. 24 is performed.

In step 2402 in FIG. 24, upon making a judgment that the wireless line being the first in the line quality rank has changed from the wireless line 1 to the wireless line 4, the monitoring and controlling unit 1251 of the wireless communication apparatus 52 makes a judgment that there is a need for preparation to shifting the backup line of the time-division multiplex transmission from the wireless line 1 to the wireless line 4. Then, the monitoring and controlling unit 1251 makes a request to the monitoring and controlling unit 1151 of the wireless communication apparatus 51 for preparation to shift the backup line of the time-division multiplex transmission from the wireless line 1 to the wireless line 4 (arrow 2301 in FIG. 23).

Upon receiving the preparation request for preparation to shift the backup line of the time-division multiplex transmission from the wireless line 1 to the wireless line 4, the monitoring and controlling unit 1151 of the wireless communication apparatus 51 makes a request for the degeneration operation of Link Aggregation for the SYS4 to the aggregation unit 1101, to release the wireless line 4 from the virtual transmission path (arrow 2302 in FIG. 23). The aggregation unit 1101 that received the request for the degeneration operation stops the assignment of the Ethernet frame to the SYS4 by the degeneration operation of Link Aggregation. Then, the aggregation unit 1101 reports the completion of the degeneration operation for the SYS4 to the monitoring and controlling unit 1151 (arrow 2303 in FIG. 23). Information about the stop of the assignment of the Ethernet frame to the SYS4 is stored in the communication carrier condition management table 241 of the monitoring and controlling unit 1151.

Meanwhile, the monitoring and controlling unit 1251 of the wireless communication apparatus 52 makes a request to the aggregation unit 1201 for the degeneration operation of Link Aggregation for the SYS4 to release the wireless line 4 from the virtual line (arrow 2304 in FIG. 23). The aggregation unit 1201 that received the request for the degeneration operation stops the assignment of the Ethernet frame to the SYS4 by the degeneration operation of Link Aggregation. Then, the aggregation unit 1201 reports the completion of the degeneration operation for the SYS4 to the monitoring and controlling unit 1251 (arrow 2305 in FIG. 23). Information about the stop of the assignment of the Ethernet frame to the SYS4 is stored in the communication carrier condition management table 241 of the monitoring and controlling unit 1251.

When the degeneration operation for the SYS4 is completed, advancement to step 2403 in FIG. 24 is performed. That is, the monitoring and controlling unit 1151 of the wireless communication apparatus 51 makes a request to the modulation/demodulation unit 1134 for changing the modulation method used for modulation in the SYS4 to 64-Quadrature Amplitude Modulation used for the time-division multiplex transmission (arrow 2306 in FIG. 23). In addition, the monitoring and controlling unit 1251 of the wireless communication apparatus 52 makes a request to the modulation/demodulation unit 1234 for changing the modulation method used for demodulation in the SYS4 to 64-Quadrature Amplitude Modulation used for the time-division multiplex transmission.

Upon receiving the change request for the modulation method from the monitoring and controlling unit 1151, the modulation/demodulation unit 1134 of the wireless communication apparatus 51 changes the modulation method to 64-Quadrature Amplitude Modulation. Then, the modulation/demodulation unit 1134 reports the completion of the modulation method change to the monitoring and controlling unit 1151 (arrow 2308 in FIG. 23).

Meanwhile, Upon receiving the change request for the modulation method from the monitoring and controlling unit 1251, the modulation/demodulation unit 1234 of the wireless communication apparatus 52 changes the modulation method to 64-Quadrature Amplitude Modulation. Then, the modulation/demodulation unit 1234 reports the completion of the modulation method change to the monitoring and controlling unit 1251 (arrow 2309 in FIG. 23).

Upon receiving the completion of the modulation method change for the SYS4, the monitoring and controlling unit 1151 of the wireless communication apparatus 51 makes a judgment that the preparation to shift the backup line of the time-division multiplex transmission has been completed. Then, the monitoring and controlling unit 1151 reports the completion of the relief preparation for shifting the backup line of the time-division multiplex transmission to the monitoring and controlling unit 1251 of the wireless communication apparatus 52 (arrow 2310 in FIG. 23).

When the monitoring and controlling unit 1251 of the wireless communication apparatus 52 receives the report of the completion of the preparation to shift the backup line of the time-division multiplex transmission, advancement to step 2404 in FIG. 24 is performed. That is, the monitoring and controlling unit 1251 makes a judgment that the switch at the transmitting end side of the SYS4 needs to be driven. Then, the monitoring and controlling unit 1251 makes a request to the monitoring and controlling unit 1151 of the wireless communication apparatus 51 for driving the switch at the transmitting end side of the SYS4 (arrow 2311 in FIG. 23).

Upon receiving the request to drive the switch at the transmitting end side of the SYS4, the monitoring and controlling unit 1151 of the wireless communication apparatus 51 makes a request to the switching unit 5121 for switching the switch at the transmitting end side of the SYS4 (arrow 2312 in FIG. 23). The switching unit 5121 that received the request drives the switch so that the data signal of the time-division multiplex transmission transmitted in the SYS1 is also transmitted in the SYS4. Then, the switching unit 5121 reports the completion of the driving of the transmitting end switch at the transmitting end side of the SYS4 to the monitoring and controlling unit 1151 (arrow 2313 in FIG. 23).

The monitoring and controlling unit 1151 that received the report of the completion of the driving of the switch at the transmitting end side of the SYS4 makes a judgment that the driving of the switch at the transmitting end side of the SYS4 has been completed. Then, the monitoring and controlling unit 1151 reports the completion of the driving of the switch at the transmitting end side of the SYS4 to the monitoring and controlling unit 1251 of the wireless communication apparatus 52 (arrow 2314 of FIG. 23).

When the monitoring and controlling unit 1251 of the wireless communication apparatus 12 receives the report of the completion of the driving of the switch at the transmitting end side of the SYS4, advancement to step 2405 in FIG. 24 is performed. That is, the monitoring and controlling unit 1251 makes a judgment that the switch at the receiving end side of the SYS4 needs to be driven. Then, the monitoring and controlling unit 1251 makes a request to the switching unit 5221 for driving the switch at the receiving end side of the SYS4 (arrow 2315 in FIG. 23).

Upon receiving the request to drive the switch at the receiving end side of the SYS4, the switching unit 5221 drives the switch so that the data signal of the time-division multiplex transmission transmitted in the SYS1 is also transmitted in the SYS4. Then, the switching unit 5221 reports the completion of the driving of the switch at the receiving end side of the SYS4 to the monitoring and controlling unit 1251 (arrow 2313 in FIG. 23).

When the monitoring and controlling unit 1251 of the wireless communication apparatus 52 receives the report of the completion of the driving of the switch at the receiving end side of the SYS4, advancement to step 2406 in FIG. 24 is performed. That is, the monitoring and controlling unit 1251 makes a judgment that there is a need to deactivate the switch at the receiving end side of the SYS1. Then, the monitoring and controlling unit 1251 makes a request to the switching unit 5221 for deactivating the switch at the receiving end side of the SYS1 (arrow 2317 in FIG. 23).

Upon receiving the request for deactivating the switch at the receiving end side of the SYS1, the switching unit 5221 deactivates the switch so as to stop the transmission for the data signal of the time-division multiplex transmission in the SYS1. Then, the switching unit 5221 reports the completion of the cancel of the switch at the receiving end side of the SYS1 to the monitoring and controlling unit 1251 (arrow 2318 in FIG. 23).

When the monitoring and controlling unit 1251 of the wireless communication apparatus 52 receives the report of the completion of the deactivation of the switch at the receiving end side of the SYS1, advancement to step 2407 in FIG. 24 is performed. That is, the monitoring and controlling unit 1251 makes a judgment that there is a need for deactivating the switch at the transmitting end side of the SYS1. Then, the monitoring and controlling unit 1251 makes a request to the monitoring and controlling unit 1151 of the wireless communication apparatus 51 for deactivating the switch at the transmitting end side of the SYS1 (arrow 2319 in FIG. 21).

Upon receiving the request for deactivating the switch at the transmitting end side of the SYS1, the monitoring and controlling unit 1151 of the wireless communication apparatus 51 makes a request to the switching unit 5121 for deactivating the switch at the transmitting end side of the SYS1 (arrow 2320 in FIG. 23). The switching unit 5121 that received the request deactivates the switch so as to stop the transmission for the data signal of the time-division multiplex transmission in the SYS1. Then, the switching unit 5121 reports the completion of the deactivation of the switch at the transmitting end side of the SYS1 to the monitoring and controlling unit 1151 (arrow 2321 of FIG. 23).

Upon receiving the report of the completion of the deactivation of the switch at the transmitting end side of the SYS1, the monitoring and controlling unit 1151 of the wireless communication apparatus 51 make a judgment that the deactivation of the switch at the transmitting end side of the SYS1 has been completed. Then, the monitoring and controlling unit 1151 reports the completion of the deactivation of the switch at the transmitting end side of the SYS1 to the monitoring and controlling unit 1251 of the wireless communication apparatus 52 (arrow 2322 in FIG. 23). The series of operations of backup line shift for the SYS1 is completed as described above (step 2408 in FIG. 24).

In the fifth embodiment, it is just that the line quality rank of the wireless line 1 has been dropped, any failure has not occurred in the wireless line 1. Therefore, after the completion of the series of operations of backup line shift in step 2408 in FIG. 24, it is possible to use the wireless line 1 as a wireless line to constitute the virtual transmission path of the Ethernet transmission, by the expansion operation of Link Aggregation.

As described above, in the fifth embodiment, after the line connection is switched from the current line of the time-division multiplex transmission to the backup line, when a change occurs in the line quality rank of the backup line, a wireless line having a higher line quality rank than the quality rank of the backup line is selected as a new backup line for the current line.

Therefore, according to the fifth embodiment, even after the line connection is switched from the current line of the time-division multiplex transmission to the backup line, a wireless line having a stable line quality may be selected as the backup line of the time-division multiplex transmission from the wireless lines constituting the virtual transmission path of the Ethernet transmission.

Lastly, the hardware configuration of the monitoring and controlling unit of the wireless communication apparatus used in the first through fifth embodiments of the present invention is explained.

FIG. 25 is a diagram illustrating a hardware configuration example of the monitoring and controlling unit of the wireless communication apparatus of the first through third embodiments.

As described above, the monitoring and controlling unit 1151 of the wireless communication apparatus 11 and the monitoring and controlling unit 1251 of the wireless communication apparatus 12 of the first embodiment include the respective units illustrated in the example diagram of the monitoring and controlling unit 20 in FIG. 2. In addition, the monitoring and controlling unit 1151 of the wireless communication apparatus 51 and the monitoring and controlling unit 1251 of the wireless communication apparatus 52 of the second embodiment include the respective units illustrated in the example diagram of the monitoring and controlling unit 20 in FIG. 2.

The controlling unit 21 of the monitoring and controlling unit 20 in FIG. 2 may be realized by a Central Processing Unit (CPU) 251 of a monitoring and controlling unit 250 in FIG. 25. The channel switching unit 22 and the wireless environment measuring unit 23 in FIG. 2 may be realized by a Field Programmable Gate Array (FPGA) 252 in FIG. 25. The storage unit 24 in FIG. 2 may be realized by a Random Access Memory (RAM) 253 in FIG. 25. The RAM 253 in FIG. 25 may store the communication carrier condition management table 241 in FIG. 2.

As described above, the monitoring and controlling unit 1151 of the wireless communication apparatus 51 and the monitoring and controlling unit 1251 of the wireless communication apparatus 52 of the third embodiment includes the respective units illustrated in the example diagram of the monitoring and controlling unit 80 in FIG. 8.

The controlling unit 21 of the monitoring and controlling unit 80 in FIG. 8 may be realized by the CPU 251 of the monitoring and controlling unit 250 in FIG. 25. The channel switching unit 22 and the wireless environment measuring unit 23 in FIG. 8 may be realized by the FPGA 252 in FIG. 25. The storage unit 24 in FIG. 8 may be realized by the RAM 253 in FIG. 25. The RAM 253 in FIG. 25 may store the communication carrier condition management table 241 and the modulation method management table 242 in FIG. 8.

FIG. 26 is a diagram illustrating a hardware configuration example of the monitoring and controlling unit of the wireless communication apparatus of the fourth and fifth embodiments.

As described above, the monitoring and controlling unit 1151 of the wireless communication apparatus 51 and the monitoring and controlling unit 1251 of the wireless communication apparatus 52 of the fourth and fifth embodiments includes the respective units illustrated in the example diagram of the monitoring and controlling unit 180 in FIG. 18.

The controlling unit 21 of the monitoring and controlling unit 180 in FIG. 18 may be realized by the CPU 251 of the monitoring and controlling unit 260 in FIG. 26. The channel switching unit 22 and the wireless environment measuring unit 23 in FIG. 18 may be realized by the FPGA 252 in FIG. 26. The storage unit 24 in FIG. 18 may be realized by the RAM 253 in FIG. 26. The RAM 253 in FIG. 26 may store the communication carrier condition management table 241 and the line quality rank management table 243 in FIG. 18. The line quality rank deciding unit 25 in FIG. 18 may be realized by a Digital Signal Processor (DSP) 254 in FIG. 26.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A receiving apparatus in a wireless communication system that uses a first data transmission and a second data transmission, the first data transmission using a virtual transmission path in which a plurality of wireless lines is virtually consolidated into one, modulation method used in each of the plurality of wireless lines being variable, the second data transmission being time-division multiplex transmission, the receiving apparatus comprising:

a releasing unit configured to release one wireless line in the plurality of wireless lines from the virtual transmission path when a failure occurs in a current line used in the time-division multiplex transmission;

a demodulation unit configured to change a modulation method used for demodulation data received via the one wireless line to a modulation method used in the time-division multiplex transmission; and a switching unit configured to switch line connection from the current line in which the failure has occurred to the one wireless line of which modulation method has been changed by the demodulation unit.

2. The receiving apparatus according to claim 1, further comprising a controlling unit configured to select a wireless line corresponding to the modulation method used in the time-division multiplex transmission from the plurality of wireless lines, wherein the releasing unit releases the wireless line selected by the controlling unit from the virtual transmission path, the demodulating unit changes a modulation method used for demodulation of the wireless line selected by the controlling unit to the modulation method used in the time-division multiplex transmission, and the switching unit switches line connection from the current line in which the failure has occurred to the wireless line selected by the controlling unit.

3. The receiving apparatus according to claim 2, wherein when the modulation method used in the time-division multiplex transmission is used in none of the plurality of wireless lines, the controlling unit selects a wireless line of which modulation method is higher-order than the modulation method of the time-division multiplex transmission.

4. The receiving apparatus according to the claim 2, wherein the controlling unit records a modulation method of each wireless line constituting the virtual transmission path when the modulation method is changed, selects a first wireless line or a second wireless line from the plurality of wireless lines constituting the virtual transmission path based on the recorded modulation method of each wireless line, and wherein the modulation method used in the first wireless line is the modulation method of the time-division multiplex transmission, and the modulation method used in the second wireless line is higher-order than the modulation method of the time-division multiplex transmission.

5. The receiving apparatus according to claim 1, further comprising a controlling unit configured to decide a line quality rank of each wireless line based on temporal transition of a parameter to characterize the line quality of the each wireless line constituting the virtual transmission path, and select one wireless line from the plurality of wireless lines constituting the virtual transmission path based on the decided line quality of each wireless line, wherein the releasing unit releases the wireless line selected the controlling unit from the virtual transmission path, the demodulation unit changes a modulation method used for demodulation of the wireless line selected by the controlling unit to the modulation method used in the time-division multiplex transmission, and the switching unit switches line connection from the current line in which the failure has occurred to the wireless line selected by the controlling unit.

6. The receiving apparatus according to claim 5, wherein a modulation method of each wireless line constituting the virtual transmission path is used as the parameter to characterize the line quality.

7. The receiving apparatus according to claim 5, wherein a reception input level or a carrier to noise ratio of each wireless line constituting the virtual transmission path is used as the parameter to characterize the line quality.

8. The receiving apparatus according to claim 5, wherein when there is a change in a line quality rank of the selected wireless line, the controlling unit newly selects another wireless line of which the line quality rank is higher than the line quality rank of the selected wireless line.

9. A transmitting apparatus in a wireless communication system that uses a first data transmission and a second data transmission, the first data transmission using a virtual transmission path in which a plurality of wireless lines is virtually consolidated into one, modulation method used in each of the plurality of wireless lines being variable, the second data transmission being time-division multiplex transmission, the transmitting apparatus comprising:

a releasing unit configured to release, upon receiving a request from a receiving apparatus of the wireless communication system, one wireless line in the plurality of wireless lines from the virtual transmission path, wherein the request is used for preparing the one wireless line to be switched from a current line in which a failure has occurred in the time-division multiplex transmission;

a modulating unit configured to change a modulation method used for demodulation data received via the one wireless line to a modulation method used in the time-division multiplex transmission; and a switching unit configured to switch line connection from the current line in which the failure has occurred to the one wireless line of which modulation method has been changed by the modulating unit.

10. The transmitting apparatus according to claim 9, further comprising a controlling unit configured to select a wireless line corresponding to the modulation method used in the time-division multiplex transmission from the plurality of wireless lines, wherein the releasing unit releases the wireless line selected by the controlling unit from the virtual transmission path, the modulating unit changes a modulation method used for demodulation of the wireless line selected by the controlling unit to the modulation method used in the time-division multiplex transmission; and the switching unit switches line connection from the current line in which the failure has occurred to the wireless line selected by the controlling unit.

11. The transmitting apparatus according to claim 10, wherein when the modulation method used in the time-division multiplex transmission is used in none of the plurality of wireless lines, the controlling unit selects a wireless line of which modulation method is higher-order than the modulation method of the time-division multiplex transmission.

12. The transmitting apparatus according to the claim 10, wherein the controlling unit records a modulation method of each wireless line constituting the virtual transmission path when the modulation method is changed, selects a first wireless line or a second wireless line from the plurality of wireless lines constituting the virtual transmission path based on the recorded modulation method of each wireless line, and wherein the modulation method used in the first wireless line is the modulation method of the time-division multiplex transmission, and the modulation method used in the second wireless line is higher-order than the modulation method of the time-division multiplex transmission.

13. The transmitting apparatus according to claim 9, further comprising a controlling unit configured to decide a line quality rank of each wireless line based on temporal transition of a parameter to characterize the line quality of the each wireless line constituting the virtual transmission path, and select one wireless line from the plurality of wireless lines constituting the virtual transmission path based on the decided line quality of each wireless line, wherein the modulating unit changes a modulation method used for demodulation of the wireless line selected by the controlling unit to the modulation method used in the time-division multiplex transmission, and the switching unit switches line connection from the current line in which the failure has occurred to the wireless line selected by the controlling unit.

14. The transmitting apparatus according to claim 13, wherein when there is a change in a line quality rank of the selected wireless line, the controlling unit newly selects another wireless line of which the line quality rank is higher than the line quality rank of the selected wireless line.

15. A line connection switching method in a wireless communication system that uses a first data transmission and a second data transmission, the first data transmission using a virtual transmission path in which a plurality of wireless lines is virtually consolidated into one, modulation method used in each of the plurality of wireless lines being variable, the second data transmission being time-division multiplex transmission, the line connection switching method comprising:

releasing one wireless line in the plurality of wireless lines from the virtual transmission path when a failure occurs in a current line used in the time-division multiplex transmission by a wireless communication apparatus;

changing a modulation method of the one wireless line released from the virtual transmission path to a modulation method used in the time-division multiplex transmission; and switching line connection from the current line in which the failure has occurred to the one wireless line of which modulation method has been changed.

* * * * *